United States Patent
Jeong et al.

(10) Patent No.: US 10,966,279 B2
(45) Date of Patent: Mar. 30, 2021

(54) MULTIPLE RADIO RESOURCE RESERVATION FOR VEHICLE-TO-EVERYTHING COMMUNICATIONS

(71) Applicant: Apple Inc., Cupertino, CA (US)

(72) Inventors: Kyeongin Jeong, Portland, OR (US); Alexey Khoryaev, Niz (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/323,957

(22) PCT Filed: Sep. 29, 2017

(86) PCT No.: PCT/US2017/054423
§ 371 (c)(1),
(2) Date: Feb. 7, 2019

(87) PCT Pub. No.: WO2018/067400
PCT Pub. Date: Apr. 12, 2018

(65) Prior Publication Data
US 2019/0182890 A1    Jun. 13, 2019

Related U.S. Application Data

(60) Provisional application No. 62/405,556, filed on Oct. 7, 2016.

(51) Int. Cl.
*H04W 76/36* (2018.01)
*H04W 76/23* (2018.01)
(Continued)

(52) U.S. Cl.
CPC ........... *H04W 76/36* (2018.02); *H04W 4/40* (2018.02); *H04W 72/1278* (2013.01);
(Continued)

(58) Field of Classification Search
None
See application file for complete search history.

(56) References Cited

U.S. PATENT DOCUMENTS

2018/0103460 A1* 4/2018 Sharma .................. H04W 72/14
2019/0132832 A1* 5/2019 Uchiyama ............... H04W 4/40
2019/0191461 A1* 6/2019 Lee ........................ H04W 8/005

OTHER PUBLICATIONS

International Patent Office—International Search Report and Written Opinion dated Dec. 13, 2017, from International Application No. PCT/US2017/054423, 13 pages.
(Continued)

*Primary Examiner* — Yaotang Wang
(74) *Attorney, Agent, or Firm* — Fish & Richardson P.C.

(57) ABSTRACT

Methods, systems, and storage media for reserving radio resources for sidelink (SL) vehicle-to-everything (V2X) transmissions are described. In embodiments, a user equipment may select to create an SL grant when a configuration indicates to transmit SL transmissions based on sensing using indicated resources. And when a number of consecutive unused transmission opportunities on the indicated resources is equal to a configured value, the UE may release all currently reserved radio resources, set a resource reservation interval, and select a set of resources spaced by the resource reservation interval as reserved resources for transmission of the one or more sidelink transmissions. Other embodiments may be described and/or claimed.

25 Claims, 12 Drawing Sheets

(51) Int. Cl.
    *H04W 76/14*    (2018.01)
    *H04W 4/40*     (2018.01)
    *H04W 76/27*    (2018.01)
    *H04W 72/12*    (2009.01)
    *H04W 72/14*    (2009.01)
    *H04W 92/18*    (2009.01)

(52) U.S. Cl.
CPC ........... *H04W 72/14* (2013.01); *H04W 76/14* (2018.02); *H04W 76/23* (2018.02); *H04W 76/27* (2018.02); *H04W 92/18* (2013.01)

(56) References Cited

OTHER PUBLICATIONS

3GPP, "Technical Specification Group Radio Access Network; Evolved Universal Terrestrial Radio Access (E-UTRA); Medium Access Control (MAC) protocol specification (Release 14)," 3GPP TS 36.321 V14.0.0 (Sep. 2016), Lte 4dvanced Pro, 48 pages.

Ericsson, "Discussion on V2X PC5 Scheduling, Resource Pools and Resource Patterns," 3GPP TSG RAN WG1 Meeting #84bis, R1-162833, Agenda Item: 7.3.2.2, Apr. 11-15, 2016, Busan, South Korea, 4 pages.

Ericsson, "Introducing Sidelink SPS in MAC," 3GPP TSG-RAN WG2 Meeting #95bis, R2-166961, Change Request, 36.321 CR xxxxx rev—Current version: 13.2.0, Oct. 10-Oct. 14, 2016, Kaohsiung, Taiwan, 6 pages.

PCT International Preliminary Report on Patentability in International Appln. No. PCT/US2017/054423, dated Apr. 9, 2019, 7 pages.

\* cited by examiner

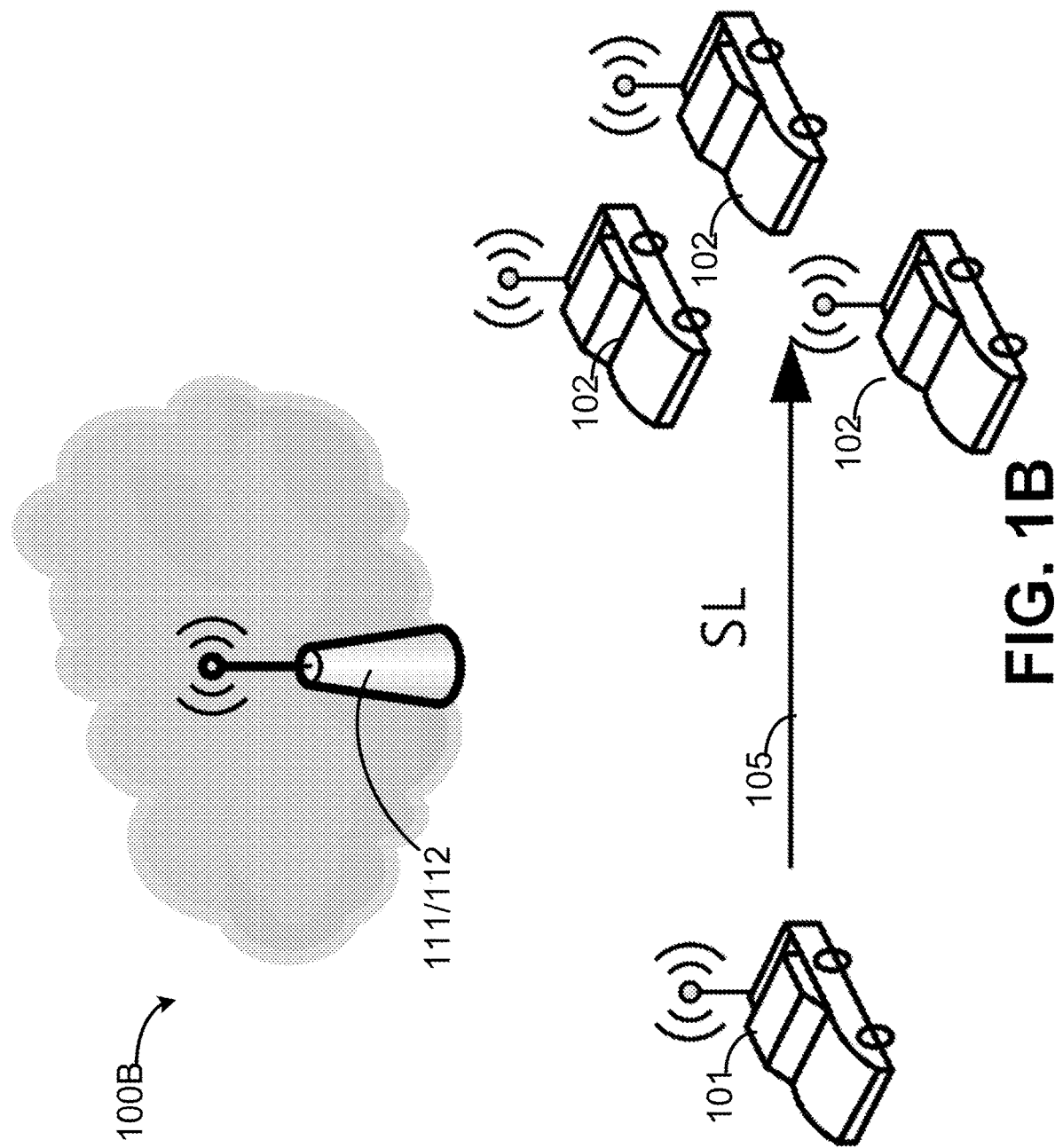

MULTIPLE RADIO RESOURCE RESERVATION FOR VEHICLE-TO-EVERYTHING COMMUNICATIONS

RELATED APPLICATIONS

The present application is a national phase entry under 35 U.S.C. § 371 of International Application No. PCT/US2017/054423, filed Sep. 29, 2017, entitled "MULTIPLE RADIO RESOURCE RESERVATION FOR VEHICLE-TO-EVERYTHING COMMUNICATIONS", which claims priority under 35 U.S.C. § 119 to U.S. Provisional Application No. 62/405,556 filed on Oct. 7, 2016, and entitled "MULTIPLE RADIO RESOURCE RESERVATION FOR V2V COMMUNICATION," the entire disclosures of which are hereby incorporated by reference.

FIELD

Various embodiments of the present application generally relate to the field of wireless communications, and in particular, to vehicle-to-everything (V2X) communications.

BACKGROUND

In third generation partnership project (3GPP) long term evolution (LTE), V2X and/or Vehicle-to-Vehicle (V2V) communication takes place over sidelink (SL) channels. SL channels may be direct links between two or more vehicle user equipment (VUEs), where data from a sender VUE may be directly transmitted to one or more receiver VUEs without base station (for example, evolved Node B (eNB)) involvement. This means that the data is not sent in uplink (UL) or downlink (DL) channels. Issues may arise when reserving resources for multiple SL transmissions, such as when the SL transmissions are based on medium sensing operations. For example, a VUE may select radio resources for transmission of application data when the application data is placed in a data buffer, but the VUE may be unable to find and reserve available radio resources in time to transmit the data.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1B illustrates an example arrangement in which vehicle-to-everything (V2X) communications may take place;

DETAILED DESCRIPTION

Figure 1A:
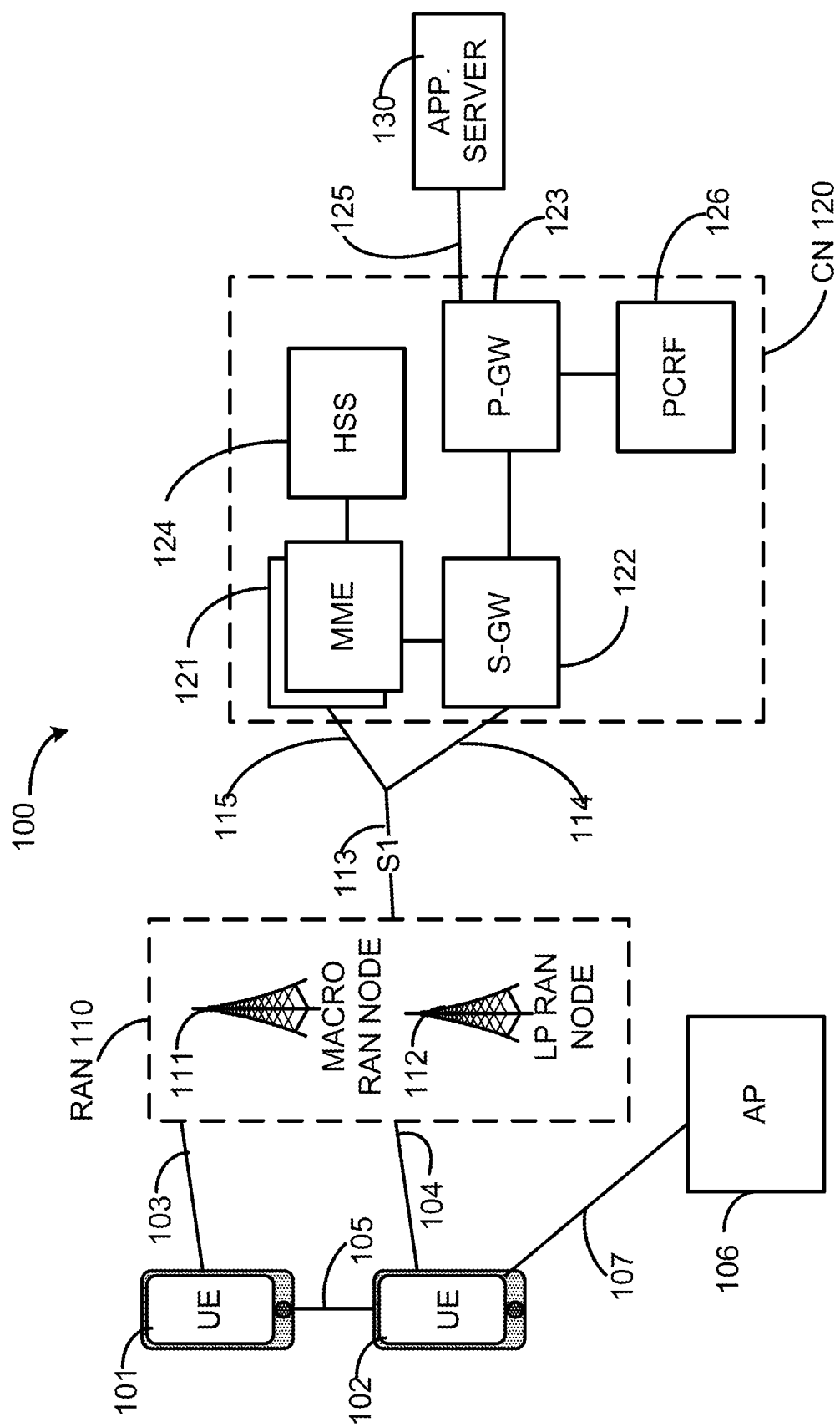
FIG. 1A illustrates an architecture of a system of a network, in accordance with various embodiments.

Embodiments discussed herein relate to mechanisms for reserving radio resources for sidelink (SL) vehicle-to-everything (V2X) transmissions. In embodiments, a user equipment (UE) may select to create an SL grant when a configuration indicates to transmit SL transmissions based on sensing using indicated resources. When a number of consecutive unused transmission opportunities on the indicated resources is equal to a configured value, the UE may release all currently reserved radio resources, set a resource reservation interval, and select a set of resources spaced by the resource reservation interval as reserved resources for transmission of the one or more sidelink transmissions.

In embodiments, if number of consecutive reserved radio resources are not used for data transmission, a Media Access Control (MAC) entity of the UE may release all reserved radio resources and may initialize values of a reserved resources counter and a resource reservation interval to zero. After those values are set to zero, and when data becomes available for transmission, the MAC entity may initialize a radio resource reservation procedure. In some embodiments, if reserved radio resources are not used for data transmission during timer, the MAC entity may release all reserved radio resources and may initialize values of a reserved resources counter and a resource reservation interval to zero. After those values are set to zero, and when data becomes available for transmission, the MAC entity may initialize a radio resource reservation procedure. In some embodiments, if the MAC entity determines a newly changed interval between two consecutive data arrivals to a buffer from an application, the MAC entity may update the radio resource interval. In some embodiments, if reserved radio resources are not used for data transmission, the MAC or a Physical layer entity may still transmit control information to inform other UEs that the radio resources are reserved with the radio resource interval, but there will be no data transmission over the radio resources. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "user equipment" or "UE" may refer to a device with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device such as consumer electronics devices, cellular phones, smartphones, feature phones, tablet computers, wearable computer devices, personal digital assistants (PDAs), desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), a roadside unit (RSU), base transceiver station (BTS), access point, etc., and may describe equipment that provides the radio baseband functions for data and/or voice connectivity between a network and one or more users.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1A illustrates an architecture of a system 100 of a network, in accordance with some embodiments. The following description is provided for an example system 100 that operates in conjunction with the Long Term Evolution (LTE) standard as provided by 3rd Generation Partnership Project (3GPP) technical specifications (TS). However, the example embodiments are not limited in this regard and the described embodiments may apply to other networks that benefit from the principles described herein, such as Fifth Generation (5G) or New Radio (NR) systems, and the like.

The system 100 is shown to include user equipment (UE) 101 and a UE 102. The UEs 101 and 102 are illustrated as smartphones (for example, handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface. According to various embodiments, the UEs 101 and 102 may be implemented as V2V or V2X communications systems, where the UEs 101 and 102 are employed or embedded in respective vehicles. Where UEs 101 or 102 are employed in a vehicle, the UEs 101 and 102 may be referred to as vehicle UEs (VUEs) 101 and 102, respectively.

In some embodiments, any of the UEs 101 and 102 can comprise an IoT UE, which can comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

The UEs 101 and 102 may be configured to connect, for example, communicatively couple, with a radio access network (RAN)—in this embodiment, an Evolved Universal Mobile Telecommunications System (UMTS) Terrestrial Radio Access Network (E-UTRAN) 110. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein.

In embodiments, the UEs 101 and 102 may directly exchange communication data via a ProSe interface 105. The ProSe interface 105 may alternatively be referred to as a sidelink (SL) interface 105 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In some embodiments, the SL interface 105 may also include a higher layer PC5 interface, which may be a reference point between ProSe-enabled UEs 101 and 102 and may be used for exchanging control and user plane communications for ProSe Direct Discovery, ProSe Direct Communication, and ProSe UE-to-Network Relaying. In various implementations, the SL interface 105 may be used in vehicular applications and communications technologies, which are often referred to as vehicle-to-everything (V2X) systems. V2X is a mode of communication where UEs (for example, UEs 101 and 102) communicate with each other directly over the PC5 interface (for example, SL interface 105) and can take place when the UEs 101 and 102 are served by RAN nodes 111/112 or when one or more UEs are outside a coverage area of the RAN 110. V2X may be classified into four different types: vehicle-to-vehicle (V2V), vehicle-to-infrastructure (V2I), vehicle-to-network (V2N), and vehicle-to-pedestrian (V2P). In these implementations, the UEs 101 and 102 may be implemented/employed as Vehicle Embedded Communications Systems (VECS) or VUEs. An example of V2X communications taking place over the SL interface 105 is shown by FIG. 1B.

Referring to FIG. 1B, which depicts an example arrangement 100B where V2X communications may take place, the VUE 101 may transmit data to one or many VUEs 102 without involvement of the RAN node 111/112. The data may be transmitted over, for example, the PSCCH and/or the PSSCH. The PSCCH may be used to convey Sidelink Control Information (SCI), which carries information that a receiving UE 102 requires in order to be able to receive and demodulate application/user data to be received over the PSSCH. The SCI may include sidelink scheduling information, such as resource block (RB) assignment(s); modulation and coding scheme (MCS); Group Destination identifier (ID), and PPPP for V2X SL communications. For device-to-device (D2D) communications, SCI is usually sent in advance to application/user data. In V2X, PSCCH and PSSCH transmissions may be transmitted in the same subframe(s).

Typically, resource allocation for V2X SL transmissions may be scheduled by a network element (for example, RAN node 111/112) or the VUE 101 may perform autonomous resource selection. The particular resource allocation mode (for example, scheduled or autonomous selection) employed by the VUE 101 may be configured using higher layer signaling (for example, using Radio Resource Control (RRC) signaling).

For autonomous resource selection, the VUE 101 may select resources on its own from one or more resource pools, and may perform transport format selection to transmit SCI and/or application/user data. To select resources on its own, the VUE 101 may perform sensing (for example, channel sensing or medium sensing operations) for (re)selection of SL resources. Based on a result of the sensing, the VUE 101 may (re)select some specific SL resource(s) and reserve multiple SL resources for transmitting the data. According to current specifications, the VUE 101 may perform up to two parallel independent resource reservation processes. The VUE 101 may also be allowed to perform a single resource selection for an individual V2X SL transmission.

When the VUE 101 is configured for autonomous resource selection, the VUE 101 may select resources from one of up to eight transmission (resource) pools according to current specifications. The resource pools may be pre-configured (for example, for out of coverage operation) or provided by RRC signaling (for example, for in-coverage operation). Each pool may be associated with one or more ProSe Per-Packet Priority (PPPP), and each PPP may be associated with a logical channel. For transmission of a MAC Protocol Data Unit (PDU), the VUE 101 may select a transmission pool in which one of the associated PPPPs is equal to the PPPP of a logical channel with a highest PPPP among the logical channel identified in the MAC PDU. It is up to UE implementation how the UE select amongst multiple pools with same associated PPPP. Additionally, there may be a one to one association between SL control pools and SL data pools.

In an example (and with reference to FIG. 1B), an application layer (for example, application layer 614 of FIGS. 6-7) of the VUE 101 may periodically generate application data in units having a same or similar size. The VUE 101 may operate a protocol stack (see for example, FIG. 7) to place the data units in a data buffer for processing by a MAC entity of the VUE 101 (see for example, MAC entity 502 of FIGS. 5-7). The MAC entity may select one or more radio resources to send the data to VUEs 102 when the data units arrive in a buffer (for example, a MAC layer SL buffer associated with an SL logical channel). In many cases, the generated data may have application specific time requirements for being communicated among VUEs 101, 102.

In some cases, the VUE 101 may be unable to identify and/or reserve available radio resources with sufficient time to transmit the data to one or more VUEs 102. For instance, if the application layer generates a packet with same/similar size every 100 milliseconds (ms), the VUE 101 should perform a radio resource selection procedure every 100 ms, which may be when data packets arrive in the buffer. However, radio resources are not always available every 100 ms, such as when another VUE 102 reserves the radio resource(s), or a portion thereof, before the VUE 101 is able to discover and reserve radio resources. If the VUE 101 fails to identify and/or reserve available radio resources, the VUE 101 cannot transmit the data in time.

To avoid such issues, many V2X applications reserve multiple radio resources in advance with an interval which is aligned with packet/data generation timing at the application layer. A legacy SL radio resource reservation procedure for reserving multiple radio resources may be as follows: (action 1) select a number of radio resources (for example, N number of resources); (action 2) select a radio resource interval (for example, M interval); (action 3) select an available radio resource for transmission of MAC PDUs, which may include Hybrid Automatic Repeat Request (HARQ) (re)transmissions; (action 4) reserve the selected radio resource equal to N resources with an M interval; (action 5) whenever the MAC PDU is transmitted, decrement N by 1; and (action 6) use the reserved radio resource for data transmission until N is equal to 0. Issues with such a procedure are shown and described with regard to FIG. 1C.

Figure 1C:
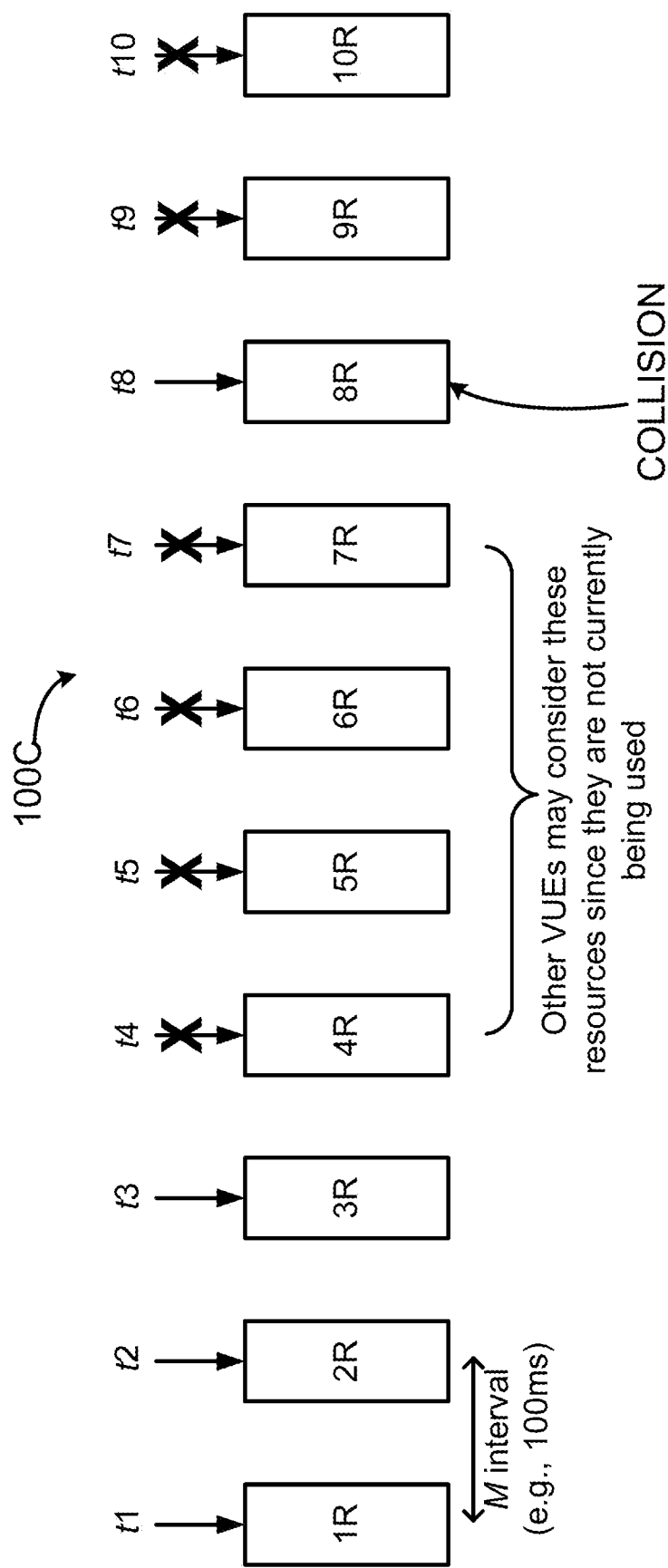
FIG. 1C illustrates an example radio resource scheme for sidelink (SL) radio resource reservation for the arrangement.

FIG. 1C depicts an example operation of radio resource scheme 100C, which may be based on the legacy SL radio resource reservation procedure discussed previously. In this example, a VUE 101/102 may reserve 10 radio resources (for example, N=10; labeled 1R to 10R in FIG. 1C) of a configured resource pool for MAC PDU transmissions, which may correspond to action 1 in the legacy procedure. The VUE 101/102 may select radio resource interval of 100 ms (for example, M=100 ms) according to a current packet generation timing from an application, which may correspond to action 2 in the legacy procedure.

When data from the application layer arrives at a buffer (for example, MAC SL buffer(s)) every 100 ms at time (t)1, t2, and t3, the MAC entity of the VUE 101/102 may select available resources 1R, 2R, and 3R of the reserved resources for transmitting respective MAC PDUs; this may correspond to actions 4 to 6 in the legacy procedure. In this example, at t4 the packet generation timing may be changed from 100 ms to 500 ms at the application, for example. The packet generation timing may change based on various factors, such as vehicle speed, channel quality fluctuations, changes in surrounding environment, etc.

In this example, the reserved radio resources 4R, 5R, 6R, and 7R will not be used since there is no data to be sent (this is represented by bold X's in FIG. 1C), which may be because data has not arrived in the buffer during the period of t4 to t7. However, during the period of t4 to t7, other VUEs may consider the resources 4R, 5R, 6R, and 7R as being available for transmission since they are not being used. The other VUEs may make this determination based on performing a channel (medium) sensing operation during the period t4 to t7, and another VUE may select one or more of these resources. Since the packet generation timing changed to 500 ms, data may arrive at the buffer at t8, which is 500 ms from the third transmission at t3. When the VUE 101 sends data over eighth reserved resource (8R), another VUE may also transmit its own data over 8R, which may result in a collision since these transmissions interfere with each other. The interference may cause the data transmission to fail. Additionally, the VUE 101 may cease to transmit data over 9R and 10R due to the collision.

In order to avoid the previously described issues, embodiments herein include mechanisms for multiple radio resource reservation for transmission in V2X SL communication, wherein:

If a number of currently reserved (consecutive) radio resources (for example, X number of resources) are not used for data transmission, a MAC entity (for example, MAC entity 502 of FIGS. 5-7) may release all currently reserved radio resources, may initialize or set the N and M values to zero, and may restart selection of radio resources when application (user) data arrives in the buffer (for example, an SL buffer associated with an SL logical channel); and/or If currently reserved radio resources are not used for data transmission during a timer, (for example, a Y timer), the MAC entity may release currently all reserved radio resources, may initialize or set the N and M values to zero, and may restart selection of radio resources when application (user) data arrives in the buffer; and/or If the MAC entity may update the M interval to correspond to a newly changed interval between two consecutive application data unit arrivals into the buffer; and/or If reserved radio resources are not used for data transmission, the MAC entity or a Physical (PHY) layer entity may still transmit SCI to other VUEs 101/102. In various embodiments, in addition to the other SCI parameters, the SCI may also indicate to the other VUEs 101/102 that the previously selected radio resources are reserved with M interval and indicate that no data transmission will occur over the reserved radio resources.

Referring back to FIG. 1A, the UE 102 is shown to be configured to access an access point (AP) 106 via connection 107. The connection 107 can comprise a local wireless connection, such as a connection consistent with any IEEE 202A.11 protocol, wherein the AP 106 would comprise a wireless fidelity (WiFi®) router. In this example, the AP 106 is shown to be connected to the Internet without connecting to the core network of the wireless system (described in further detail below).

The Radio Access Network (RAN) 110 can include one or more access nodes that enable the connections 103 and 104. These access nodes (ANs) can be referred to as base stations (BSs), NodeBs, evolved NodeBs (eNBs), next Generation NodeBs (gNBs), RAN nodes, Road Side Units (RSUs), and so forth, and can comprise ground stations (for example, terrestrial access points) or satellite stations providing coverage within a geographic area (for example, a cell). The RAN 110 may include one or more RAN nodes for providing macrocells, for example, macro RAN node 111, and one or more RAN nodes for providing femtocells or picocells (for example, cells having smaller coverage areas, smaller user capacity, or higher bandwidth compared to macrocells), for example, low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (for example, for downlink communications) or a Single Carrier Frequency Division Multiple Access (SC-FDMA) communication technique (for example, for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (for example, assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (for example, aggregation level, L=1, 2, 4, or 8).

Some embodiments may use concepts for resource allocation for control channel information that are an e2ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network—in this embodiment, Core Network (CN) 120 (for example, an Evolved Packet Core (EPC)) via an S1 interface 113. In this embodiment the S1 interface 113 is split into two parts, the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the EPC network 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The EPC network 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the EPC network 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and e2ernal networks such as a network including the application server 130 (alternatively referred to as application function (AF)) via an Internet Protocol (IP) interface 125. Generally, the application server 130 may be an element offering applications that use IP bearer resources with the core network (for example, UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (for example, Voice-over-Internet Protocol (VoIP) sessions, PTT sessions, group communication sessions, social networking services, etc.) for the UEs 101 and 102 via the EPC network 120.

The P-GW 123 may further be a node for policy enforcement and charging data collection. Policy and Charging Enforcement Function (PCRF) 126 is the policy and charging control element of the EPC network 120. In a non-roaming scenario, there may be a single PCRF in the Home Public Land Mobile Network (HPLMN) associated with an RE's Internet Protocol Connectivity Access Network (IP-CAN) session. In a roaming scenario with local breakout of traffic, there may be two PCRFs associated with an RE's IP-CAN session, a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
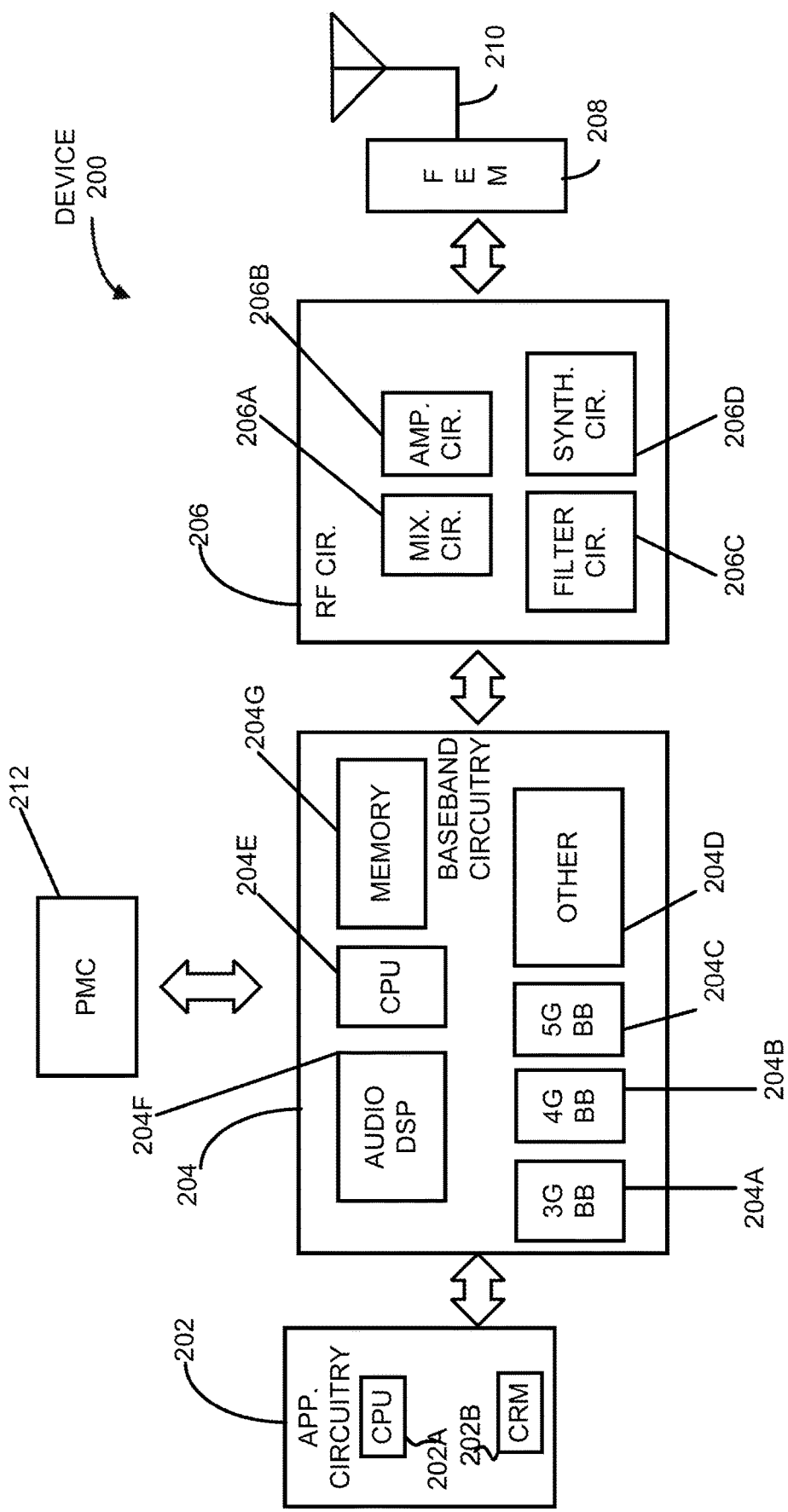
FIG. 2 illustrates example components of a device, in accordance with various embodiments.

FIG. 2 illustrates example components of a device 200 in accordance with some embodiments. In embodiments, the device 200 may be implemented in or by UE 101 or UE 102 of FIG. 1. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a RE or a RAN node. In some embodiments, the device 200 may include less elements (for example, a RAN node may not utilize application circuitry 202, and instead include a processor/controller to process IP data received from an EPC and/or a 5GC)). In some embodiments, the device 200 may include additional elements such as, for example, network interface cards, display, camera, sensor(s), or input/output (I/O) interface. In other embodiments, the components described below may be included in more than one device (for example, said circuitries may be separately included in more than one device for Cloud-RAN (C-RAN) implementations). The components may communicate over a suitable bus technology, such as industry standard architecture (ISA); extended ISA (EISA); peripheral component interconnect (PCI); peripheral component interconnect extended (PCIx); PCI express (PCIe); a proprietary bus, for example, used in a SoC based system; an I2C interface, an SPI interface, point to point interfaces, a power bus, or any number of other technologies.

The application circuitry 202 may include one or more application processors 202A. For example, the application circuitry 202 may include circuitry such as, but not limited to, one or more single-core or multi-core processors, a microprocessor, a multithreaded processor, an ultra-low voltage processor, an embedded processor, or other known processing element. The processor(s) 202A may include any combination of general-purpose processors and dedicated processors (for example, graphics processors, application processors, etc.). The processors 202A may be coupled with or may include memory/storage 202B (also referred to as "computer readable media 202B" and the like) and may be configured to execute instructions stored in the memory/storage to enable various applications or operating systems to run on the device 200. In some embodiments, processors of application circuitry 202 may process IP data packets received from an EPC.

The memory/storage 202B may comprise any number of memory devices used to provide for a given amount of system memory. As an example, the memory 202B may include random access memory (RAM) in accordance with a Joint Electron Devices Engineering Council (JEDEC) double data rate (DDR) or low power double data rate (LPDDR)-based design. In various implementations, individual memory devices may be formed of any number of different package types, such as single die package (SDP), dual die package (DDP) or quad die package (Q17P), dual inline memory modules (DIMMs) such as microDlMMs or MiniDIMMs, and/or any other like memory devices. To provide for persistent storage of information such as data, applications, operating systems and so forth, the memory/storage 202B may include one or more mass-storage devices, such as a solid state disk drive (SSDD); flash memory cards, such as SD cards, microSD cards, xD picture cards, and the like, and USB flash drives; on-die memory or registers associated with the processors 202A (for example, in low power implementations); a micro hard disk drive (HDD); three dimensional cross-point (3D XPOINT) memories from Intel® and Micron®, etc.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), si2h generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SoC), an integrated circuit, or a single package.

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (for example, Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (for example, N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (for example, based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (for example, twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (for example, to the RF circuitry 206). The transmit signal path of the FEM circuitry 208 may include a power amplifier (PA) to amplify input RF signals (for example, provided by RF circuitry 206), and one or more filters to generate RF signals for subsequent transmission (for example, by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in an RE, UE, etc. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an e2ended period of time, then the device 200 may transition off to an RRC Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
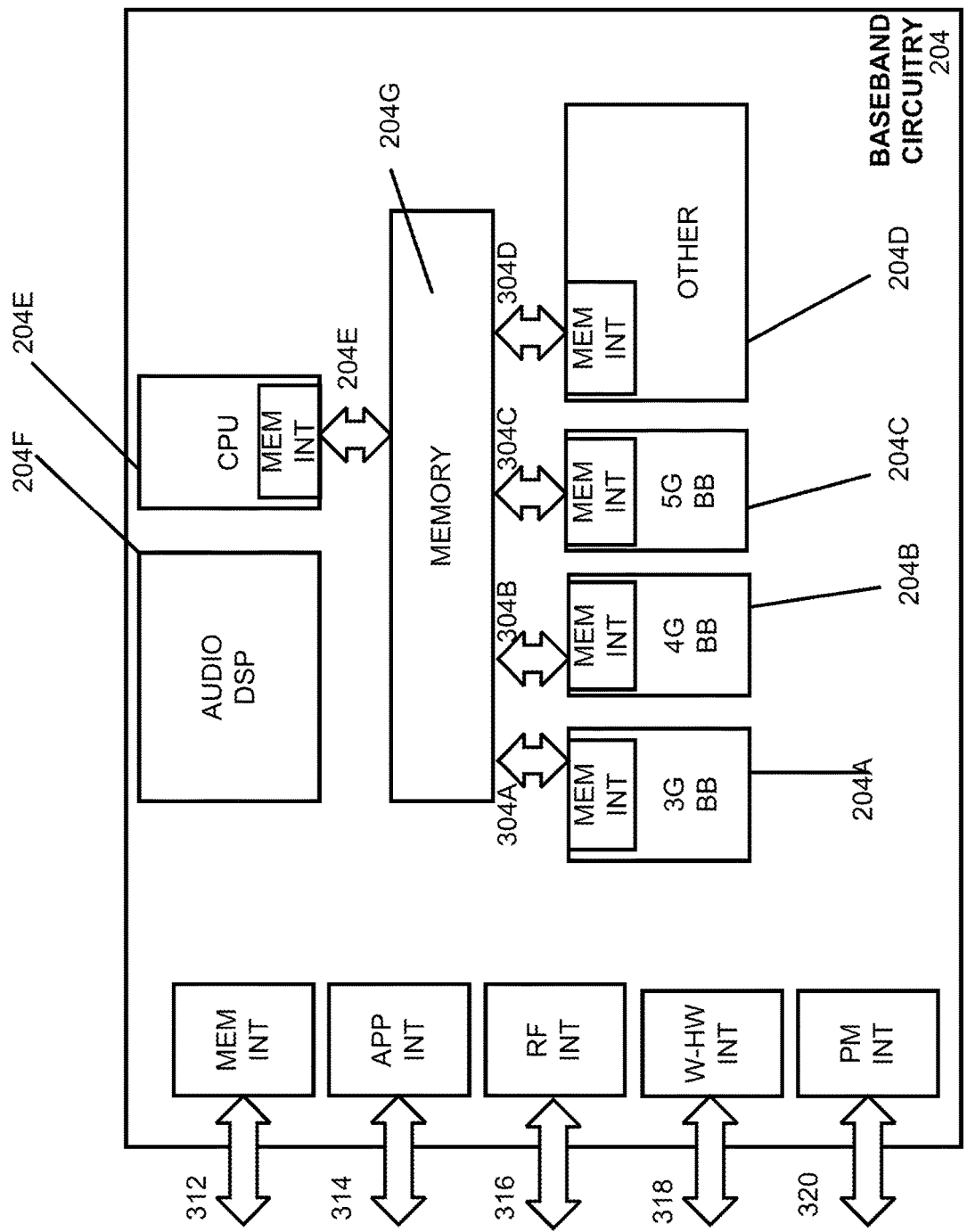
FIG. 3 illustrates example interfaces of baseband circuitry, in accordance with various embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (for example, an interface to send/receive data to/from memory e2ernal to the baseband circuitry 204), an application circuitry interface 314 (for example, an interface to send/receive data to/from the application circuitry 202 of FIG. 2), an RF circuitry interface 316 (for example, an interface to send/receive data to/from RF circuitry 206 of FIG. 2), a wireless hardware connectivity interface 318 (for example, an interface to send/receive data to/from Near Field Communication (NFC) components, Bluetooth® components (for example, Bluetooth® Low Energy), Wi-Fi® components, and other communication components), and a power management interface 320 (for example, an interface to send/receive power or control signals to/from the PMC 212.

Figure 4:
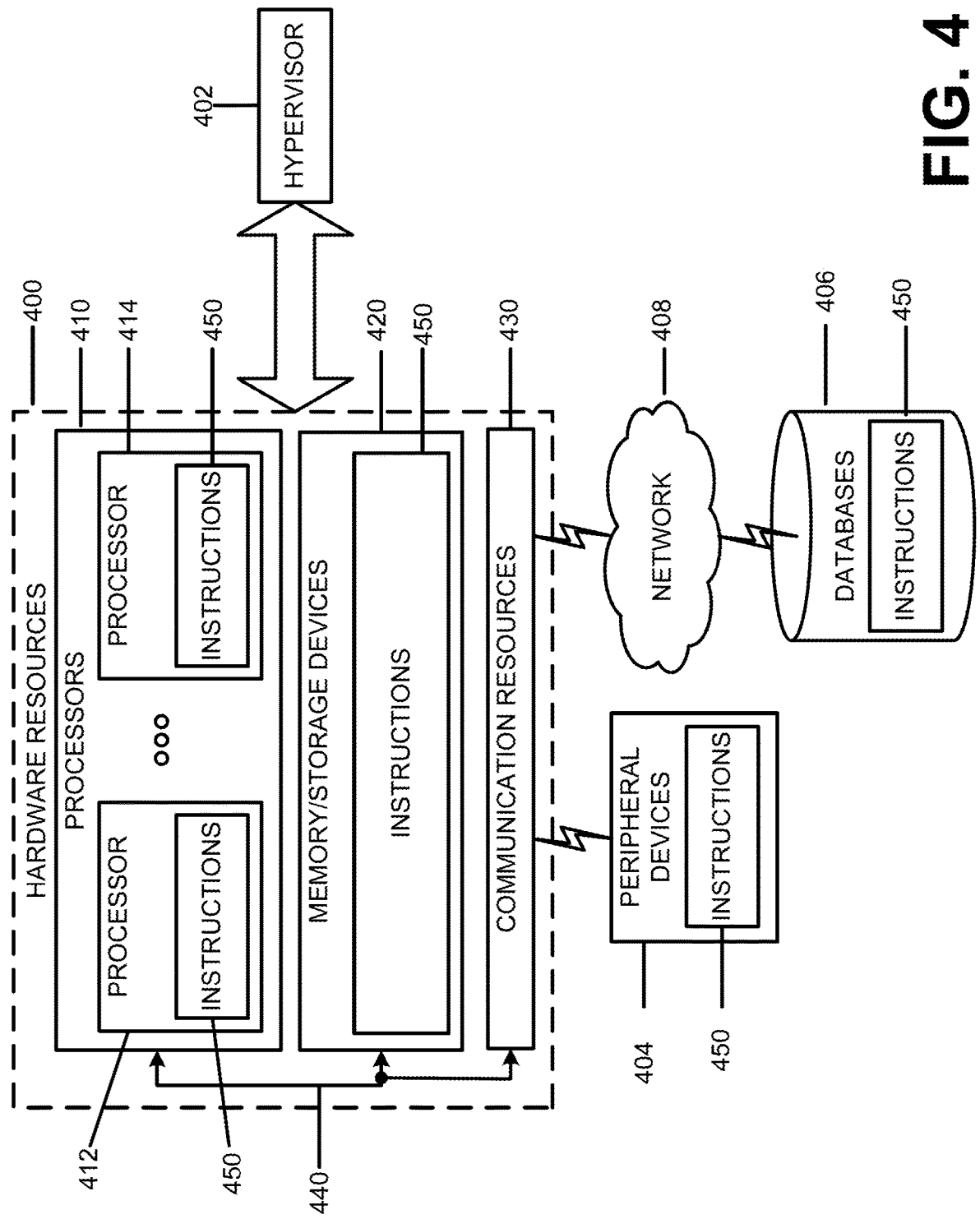
FIG. 4 depicts a block diagram illustrating components, according to some example embodiments, able to read instructions from a machine-readable or computer-readable medium (for example, a non-transitory machine-readable storage medium) and perform any one or more of the methodologies discussed herein.

FIG. 4 is a block diagram illustrating components, according to some example embodiments, able to read instructions from a machine-readable or computer-readable medium (for example, a non-transitory machine-readable storage medium) and perform any one or more of the methodologies discussed herein. In embodiments, hardware resources 400 may be employed in or as any of the elements discussed with regard to FIG. 1A and/or may correspond to application circuitry 202 shown and described with regard to FIG. 2. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440. For embodiments where node virtualization (for example, NFV) is utilized (for example, when Hardware resources 400 employed in or as a core network element or RAN node/element), a hypervisor 402 may be executed to provide an execution environment for one or more network slices/sub-slices to utilize the hardware resources 400.

The processors 410 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 412 and a processor 414.

The memory/storage devices 420 may include main memory, disk storage, or any suitable combination thereof. The memory/storage devices 420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, and/or any other type of memory device technology, such as those discussed herein.

The communication resources 430 may include interconnection or network interface components or other suitable devices to communicate with one or more peripheral devices 404 or one or more databases 406 via a network 408. For example, the communication resources 430 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (for example, within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

Figure 5:
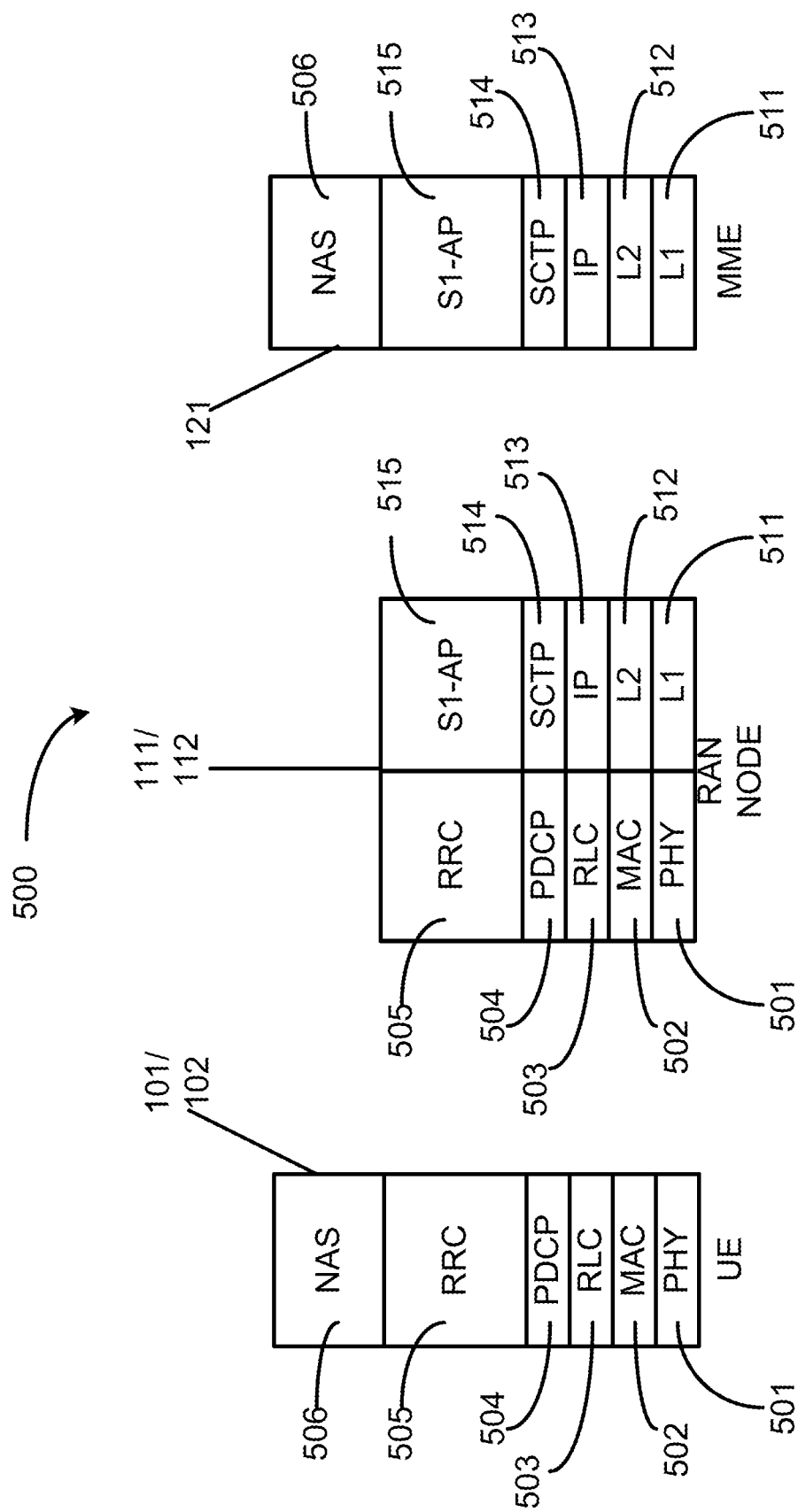
FIG. 5 is an illustration of a control plane protocol stack in accordance with various embodiments.

FIG. 5 is an illustration of a control plane protocol stack in accordance with some embodiments. In this embodiment, a control plane 500 is shown as a communications protocol stack between the UE 101 (or alternatively, the UE 102), the RAN node 111 (or alternatively, the RAN node 112), and the MME 121.

The PHY layer 501 may transmit or receive information used by the MAC layer 502 over one or more air interfaces. The PHY layer 501 may further perform link adaptation or adaptive modulation and coding (AMC), power control, cell search (for example, for initial synchronization and handover purposes), and other measurements used by higher layers, such as the RRC layer 505. The PHY layer 501 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 502 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 503 may operate in a plurality of modes of operation, including: Transparent Mode (TM), Unacknowledged Mode (UM), and Acknowledged Mode (AM). The RLC layer 503 may execute transfer of upper layer protocol data units (PDUs), error correction through automatic repeat request (ARQ) for AM data transfers, and concatenation, segmentation and reassembly of RLC SDUs for UM and AM data transfers. The RLC layer 503 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 504 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (for example, ciphering, deciphering, integrity protection, integrity verification, etc.).

The main services and functions of the RRC layer 505 may include broadcast of system information (for example, included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (for example, RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (for example, an LTE-Uu interface) to exchange control plane data via a protocol stack comprising the PHY layer 501, the MAC layer 502, the RLC layer 503, the PDCP layer 504, and the RRC layer 505.

The non-access stratum (NAS) protocols 506 form the highest stratum of the control plane between the UE 101 and the MME 121. The NAS protocols 506 support the mobility of the UE 101 and the session management procedures to establish and maintain IP connectivity between the UE 101 and the P-GW 123.

The S1 Application Protocol (S1-AP) layer 515 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 514 may ensure reliable delivery of signaling messages between the RAN node 111 and the MME 121 based, in part, on the IP protocol, supported by the IP layer 513. The L2 layer 512 and the L1 layer 511 may refer to communication links (for example, wired or wireless) used by the RAN node and the MME to exchange information.

The RAN node 111 and the MME 121 may utilize an S1-MME interface to exchange control plane data via a protocol stack comprising the L1 layer 511, the L2 layer 512, the IP layer 513, the SCTP layer 514, and the S1-AP layer 515.

Figure 6:
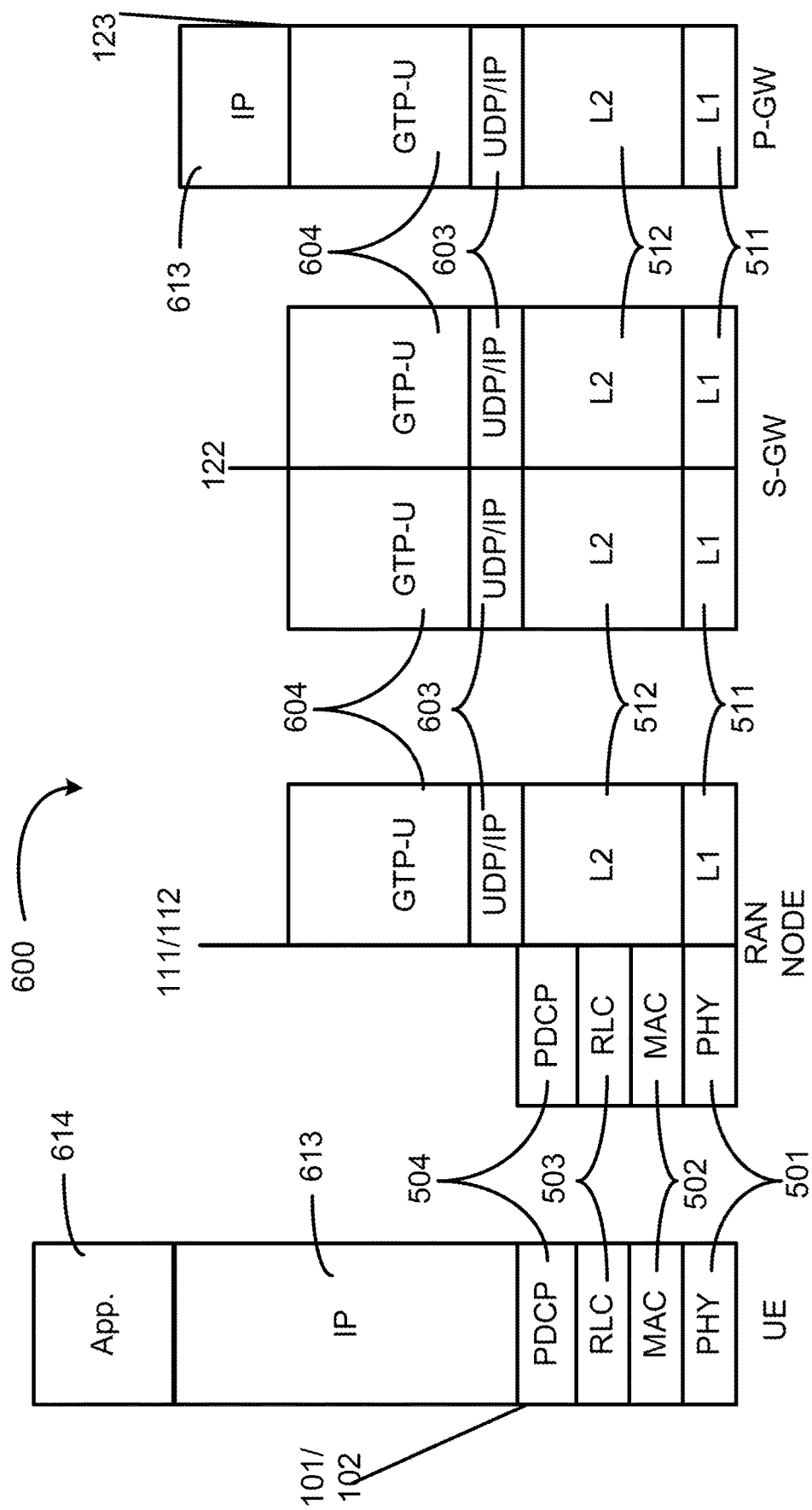
FIG. 6 is an illustration of a user plane protocol stack in accordance with various embodiments.

FIG. 6 is an illustration of a user plane protocol stack in accordance with some embodiments. In this embodiment, a user plane 600 is shown as a communications protocol stack between the UE 101 (or alternatively, the UE 102), the RAN node 111 (or alternatively, the RAN node 112), the S-GW 122, and the P-GW 123. The user plane 600 may utilize at least some of the same protocol layers as the control plane 500. For example, the UE 101 and the RAN node 111 may utilize a Uu interface (for example, an LTE-Uu interface) to exchange user plane data via a protocol stack comprising the PHY layer 501, the MAC layer 502, the RLC layer 503, the PDCP layer 504.

The application layer 614 may be a layer in which a user of the UE 101/102 interacts with software applications being executed, for example, by application circuitry 202. The application layer 614 may also provide one or more interfaces for software applications to interact with communications systems of the UE 101/102, such as the baseband circuitry 204. In some implementations the IP layer 613 and/or the application layer 614 may provide the same or similar functionality as layers 5-7, or portions thereof, of the Open Systems Interconnection (OSI) model (for example, OSI Layer 7—the application layer, OSI Layer the presentation layer—X, and OSI Layer 5—the session layer).

The Internet Protocol (IP) layer 613 (also referred to as the "Internet layer") may be used to perform packet addressing and routing functionality. The IP layer 613 may assigned IP addresses to user data packets in any of IPv4, IPv6, or PPP formats, for example. The General Packet Radio Service (GPRS) Tunneling Protocol for the user plane (GTP-U) layer 604 may be used for carrying user data within the GPRS core network and between the radio access network and the core network. The user data transported can be packets in any of IPv4, IPv6, or PPP formats, for example. The UDP and IP security (UDP/IP) layer 603 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 511, the L2 layer 512, the UDP/IP layer 603, and the GTP-U layer 604. The S-GW 122 and the P-GW 123 may utilize an S5/S8a interface to exchange user plane data via a protocol stack comprising the L1 layer 511, the L2 layer 512, the UDP/IP layer 603, and the GTP—U layer 604. As discussed above with respect to FIG. 4, NAS protocols support the mobility of the UE 101 and the session management procedures to establish and maintain IP connectivity between the UE 101 and the P-GW 123.

Figure 7:
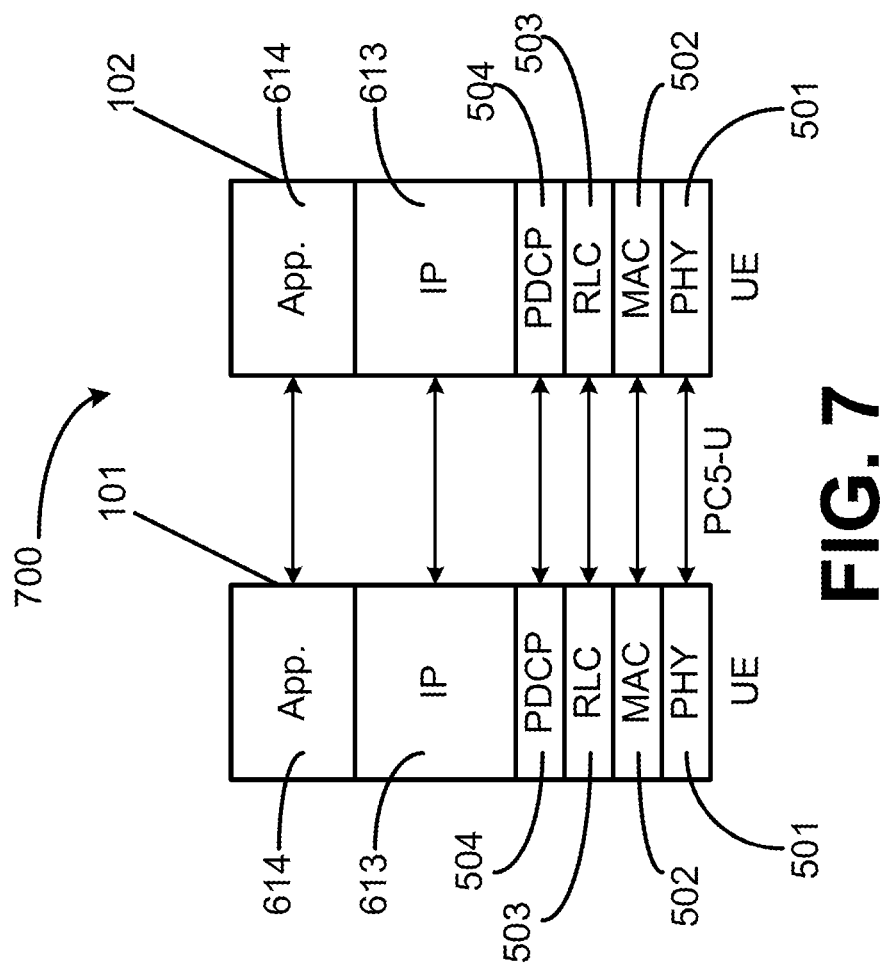
FIG. 7 is an illustration of an SL protocol stack in accordance with various embodiments.

FIG. 7 is an illustration of an SL protocol stack in accordance with some embodiments. In this embodiment, an SL plane 700 is shown as a communications protocol stack between at least two UEs, such as the UE 101 and the UE 102. Additionally, the SL plane 700 may utilize at least some of the same protocol layers as the control plane 500 and the user plane 600. For example, the UE 101 and the UE 102 may utilize a PC5 interface to exchange user data via the protocol stack comprising the PHY layer 501, the MAC layer 502, the RLC layer 503, the PDCP layer 504, the IP layer 512, and the application layer 614. These layers may operate in the same manner as discussed previously, but with the following modifications.

The PDCP layer 504 may perform ciphering (if configured) and header compression (if configured) for SL data transmission; and perform deciphering (if configured) and header decompression (if configured) for SL data reception. Additionally, the PDCP layer 504 may not be required to maintain PDCP SNs and/or Hyper Frame Numbers (HFNs) for SL data communications.

The RLC layer 503 may operate in the RLC UM for SL communication, where each UE 101/102 maintains at least one RLC UM entity per transmitting peer UE 101/102. An UM RLC entity is configured either as a transmitting UM RLC entity or a receiving UM RLC entity. The transmitting UM RLC entity receives RLC SDUs from upper layer and sends RLC PDUs to its peer receiving UM RLC entity via lower layers. The receiving UM RLC entity delivers RLC SDUs to upper layer and receives RLC PDUs from its peer transmitting UM RLC entity via lower layers.

The MAC layer 502 may provide data transfer services (for example, mapping, multiplexing/demultiplexing, PDU filtering, etc.) for SL logical channels to SL transport channels. For example, the MAC layer 502 may map a Sidelink Traffic Channel (STCH) to a Sidelink Shared Channel (SL-SCH). The STCH is a point-to-point and a point-to-multipoint channel used for transfer of user/application data from one UE to one or more other UEs. The SL-SCH is a transport channel that may be used to transmit user/application data from one UE to one or more other UEs. The user/application data of the SL-SCH is conveyed to the other UEs over the PSSCH. In order to transmit on the SL-SCH, the MAC entity 502 must have at least one sidelink grant. In embodiments where the VUE 101/102 is configured to transmit (V2X) SL communications based on sensing, the MAC entity 502 may create the SL grant based on configuration information, which may be indicated to the VUE 101/102 via RRC signaling, for example.

According to various embodiments, if the MAC entity 502 is configured by upper layers (for example, RRC layer 505) to transmit based on sensing using a pool of resources as indicated by the PHY layer 501, the MAC entity 403 may select to create a configured SL grant corresponding to transmissions of multiple MAC PDUs, and when data is available in Sidelink Traffic Channel (STCH), the MAC entity 403 may, for each SL process configured for multiple transmissions based on sensing:

(A) clear a configured SL grant (if available).

(B) select one of the allowed values configured by upper layers and set the resource reservation interval by multiplying 100 with the selected value. The allowed values may be indicated by an V2X SL configuration. For example, the allowed values may be indicated by a restrictResourceReservationPeriod field of an SL-CommTxPoolSensingConfig information element (IE) in an RRC message.

(C) randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set a counter to the selected value. The counter may be referred to as an SL RESOURCE RESELECTION COUNTER and the like.

(D) randomly select one time and frequency resource from the resources indicated by the PHY layer 501. The random function may be such that each of the allowed selections can be chosen with equal probability.

(E) use the randomly selected resource to select a set of periodic resources spaced by the resource reservation interval for transmission opportunities of SCI and SL-SCH corresponding to the number of transmission opportunities of MAC PDUs as determined or identified by the PHY 401.

(F) use the selected sidelink grant to determine the set of subframes in which transmissions of SCI and SL-SCH occur according to the PHY 401.

And (G) consider the selected sidelink grant to be a configured sidelink grant.

In embodiments, operations (A)-(G) may be performed if a number of consecutive unused transmission opportunities are configured and the number of consecutive unused transmission opportunities on resources indicated in the configured sidelink grant is equal to a configured value. In embodiments, the configured value may be indicated by an sl-ReselectAfter field of the SL-CommTxPoolSensingConfig IE. Additionally, when the MAC entity 502 has a configured SL grant occurring in a subframe, such as the SL grant generated according to actions A-G of the previously discussed procedure, the MAC entity 502 may, for each subframe, instruct the PHY layer 501 to transmit user/application data and/or SCI corresponding to the configured SL grant.

Figure 8:
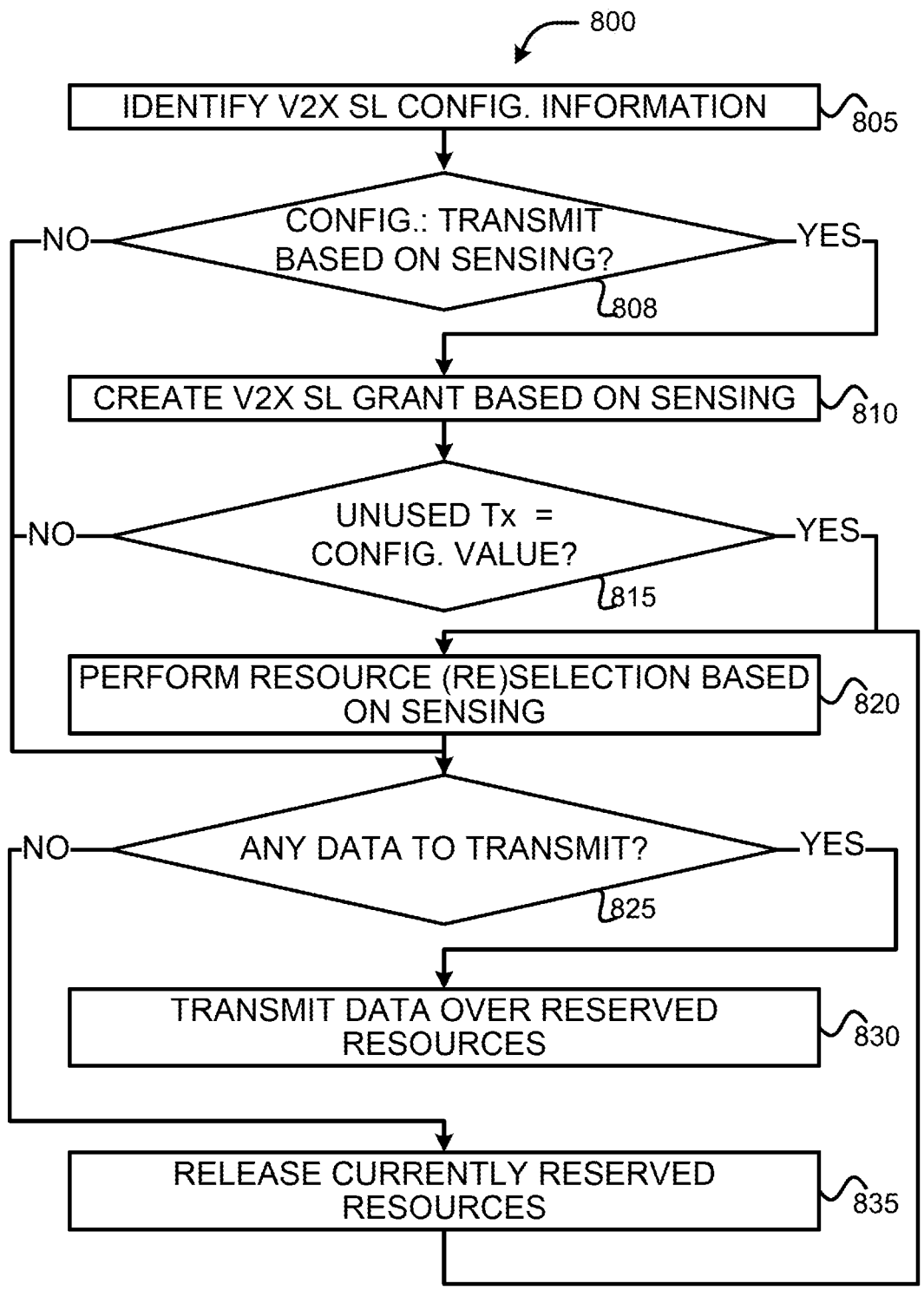
FIG. 8 illustrates an example process for reserving resources for V2X SL communications, in accordance with various embodiments.
Figure 9:
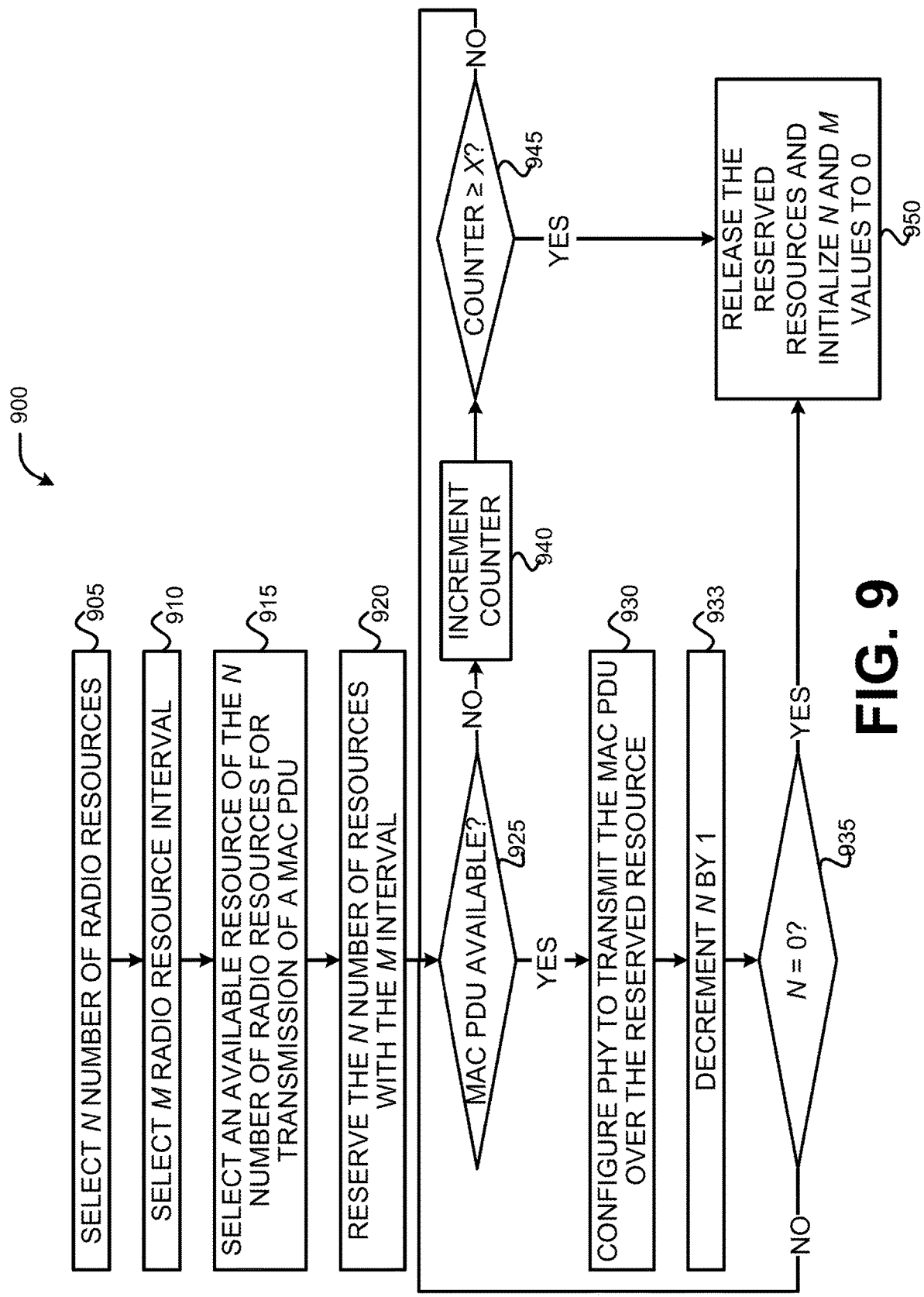
FIG. 9 illustrates another example process for reserving resources for V2X SL communications, in accordance with various embodiments.
Figure 10:
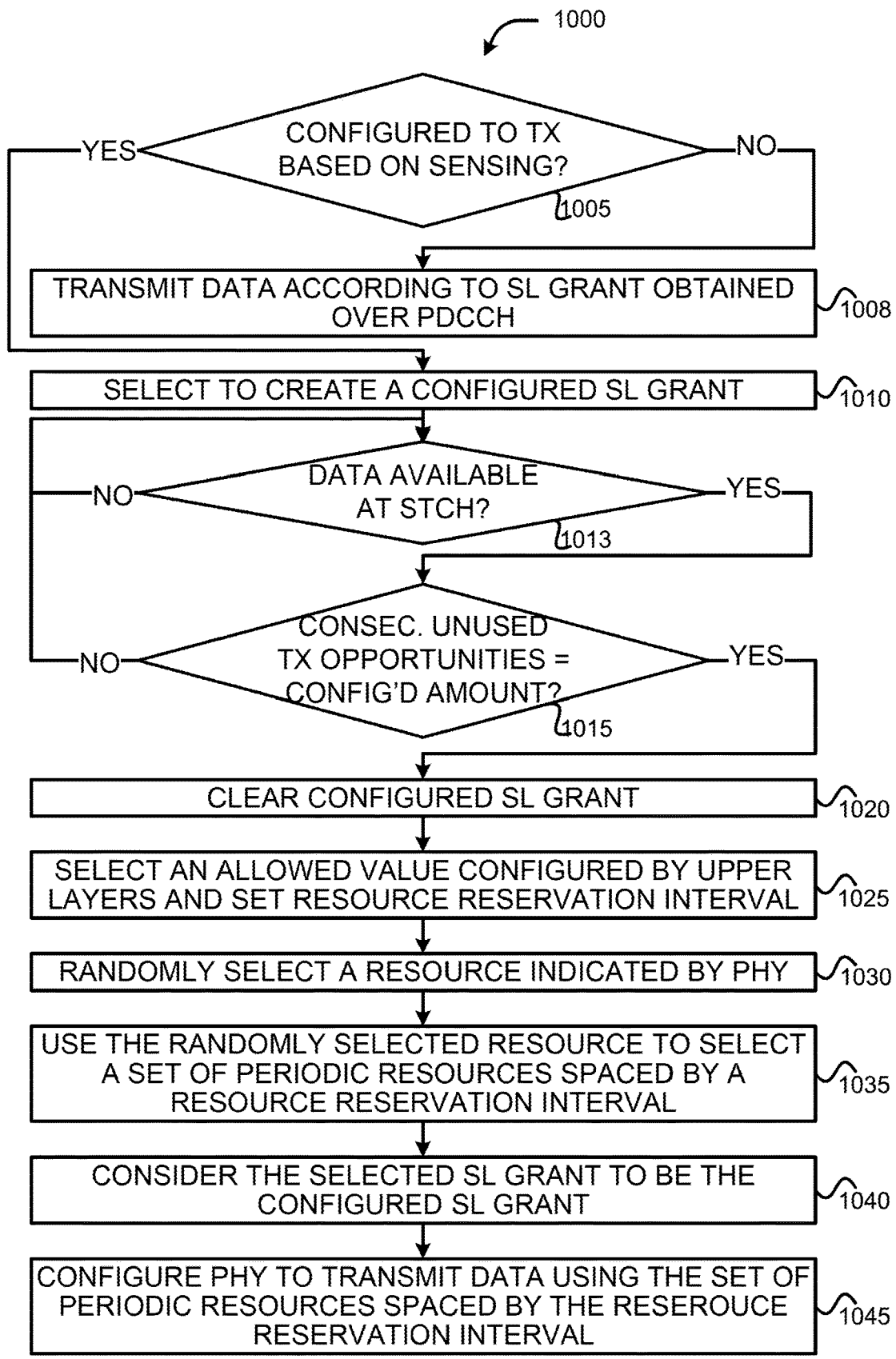
FIG. 10 illustrates yet another example process for reserving resources for V2X SL communications, in accordance with various embodiments.

FIGS. 8-10 illustrate processes 800-1000, respectively, for reserving resources for V2X SL communications, according to various embodiments. For illustrative purposes, the operations of processes 800-1000 are described as being performed by the VUE 101 of FIGS. 1A-1B in order to transmit data to a VUE 102 of FIGS. 1A-1B. Some of the process 800-1000 may include communications between various devices, and it should be understood that such communications may be facilitated by the various circuitry as described with regard to FIGS. 1-4 using the various messages/protocols/entities/layers discussed with regard to FIGS. 5-7. Moreover, while particular examples and orders of operations are illustrated in FIGS. 8-10, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Referring to FIG. 8, an example process 800 for configuring a VUE for V2X SL communications, is shown. In embodiments, processor circuitry of the VUE 101 (for example, baseband circuitry 204) may operate the MAC entity 502 to perform the various operations of process 800. Process 800 may begin at operation 805 where the MAC entity 502 may identify V2X SL configuration information. At operation 808, the MAC entity 502 may determine whether the V2X SL configuration information indicates to transmit based on sensing using an individual pool of resources.

In embodiments, the MAC entity 502 may be configured by the RRC layer 505 based on an obtained RRC message. The RRC message may include a SL configuration (also referred to as a "V2X SL configuration" and the like). The SL configuration may indicate whether or not the VUE 101 is to transmit SL transmissions based on a sensing operation using an individual pool of resources for SL communications. When the SL configuration indicates to transmit based on sensing, the SL configuration may also indicate the individual pool of resources to be used for SL communications; a number of consecutive skipped transmissions before triggering resource reselection; one or more values that are allowed for signaling of a resource reservation period, and other suitable information for V2X communications based on sensing.

In an example, the V2X SL configuration may be included in an RRC connection establishment message or an RRC connection reestablishment message. Either message may include a system information block type 21 (SIB21) information element (IE), which may be an IE that contains various V2X SL communication configurations. One such V2X SL configuration may be a V2X Resource Selection Configuration (v2x-ResourceSelectionConfig) IE, which indicates V2X SL communication configurations used for UE autonomous resource selection. The v2x-ResourceSelectionConfig IE may include a Sidelink Communication Transmission Pool Sensing Configuration (SL-CommTxPoolSensingConfig) IE. The SL-CommTxPoolSensingConfig IE may include a Sidelink Reselection After (sl-ReselectAfter) field, which may indicate the number of consecutive skipped transmissions before triggering resource reselection for V2X sidelink communication. The SL-CommTxPoolSensingConfig IE may also include a restrict Resource Reservation Period (restrictResourceReservationPeriod) field, which may indicate one or more values that are allowed for signaling of a resource reservation period.

In this example, the resource pools may be indicated by V2X communication transmission pool list (v2x-CommTx-PoolList) field/IE of an SL V2X Pre-configuration (SL-V2X-Preconfiguration) IE; a normal V2X communication transmission pool (v2x-CommTxPoolNormalCommon) IE, or a dedicated normal V2X communication transmission pool (v2x-commTxPoolNormalDedicated) field/IE in a SL V2X dedicated configuration (sl-V2X-ConfigDedicated) IE. The SL-V2X-Preconfiguration IE may indicate various SL pre-configured parameters used for V2X SL communication, and the v2x-CommTxPoolList field/IE may indicate a list of transmission pools for V2X SL communication that are preconfigured at the VUE 101. The v2x-CommTxPoolNormalCommon IE or the v2x-commTxPoolNormalDedicated IE may be included in the SIB21 or some other part of the RRC message.

In this example, the RRC layer 505 may configure lower layers (for example, the MAC entity 502) to transmit the SCI and/or the corresponding data based on sensing using one of the resource pools indicated by v2x-CommTxPoolList in SL-V2X-Preconfiguration for V2X SL communication, or using one of the resource pools indicated by v2x-CommTxPoolNormalCommon or v2x-CommTxPoolNormal in v2x-InterFreqInfoList for the concerned frequency. Selection of the individual resource pool may be based on VUE 101 implementation. In some embodiments, when the VUE 101 is configured by upper layers to transmit V2X SL communication, the VUE 101 may perform sensing on all pools of resources that may be used for transmission of the SCI and/or user/application data.

Referring back to FIG. 8, if at operation 808 the MAC entity 502 determines that the V2X SL configuration information does not indicate to transmit based on sensing, the MAC entity 502 may proceed to operation 825 to determine whether there is any data to transmit. If the V2X SL configuration information does indicate to transmit based on sensing using an individual pool of resources, the MAC entity 502 may proceed to operation 810 where the MAC entity 502 may select to create a V2X SL grant when the SL configuration indicates to transmit SL transmissions based on sensing using the indicated resources.

At operation 815, the MAC entity 502 may determine whether a number of consecutive unused transmission opportunities on the indicated resources is equal to a configure value (for example, the number of consecutive skipped transmissions before triggering resource reselection indicated by the obtained RRC message). If at operation 815 the MAC entity 502 determines that the number of consecutive unused transmission opportunities on resources indicated in the SL grant is not equal to the configured value, the MAC entity 502 may proceed to operation 825 to determine whether there is any data to transmit. If at operation 815 the MAC entity 502 determines that the number of consecutive unused transmission opportunities on resources indicated in the SL grant is equal to the configured value, the MAC entity 502 may proceed to operation 820 to perform resource reselection based on sensing.

At operation 820, the MAC entity 502 may perform resource reselection based on one or more sensing operations. In embodiments, the MAC entity 502 at operation 810 may release all currently reserved radio resources (if any), set a resource reservation interval, and select a set of resources spaced by the resource reservation interval as the reserved resources for transmission. Additionally, the MAC entity 502 may consider the selected SL grant to be a configured SL grant.

In embodiments, the SL grant may correspond to transmissions for multiple MAC PDUs, and the MAC PDUs may include SCI or application data. In such embodiments, the set of resources selected at operation 820 may be for transmission opportunities of SCI or application/user data that correspond to a number of transmission opportunities of the multiple MAC PDUs. The application/user data may be data ready to be transmitted over the SL-SCH, such as when one or more MAC PDUs are available in the STCH.

At operation 825, the MAC entity 502 may determine whether any data (for example, user data and/or SCI) is available for transmission. If at operation 825 the MAC entity 502 determines that data is available for transmission, the MAC entity 502 may proceed to operation 835 to release the currently reserved resources. After performance of operation 835, the MAC entity 502 may loop back to operation 820 to perform resource reselection based on sensing.

If at operation 825 the MAC entity 502 determines that data is available for transmission, the MAC entity 502 may proceed to operation 830 to configure the PHY layer 501 to transmit the data over the reserved resources. When the data comprises SCI, the MAC entity 502 may instruct the PHY entity 501 to transmit the SCI over a PSCCH. When the data comprises user/application data, the MAC entity 502 may instruct the PHY entity 501 to transmit the user/application data over a PSSCH. After performance of operation 830, process 800 may end or repeat as necessary.

Referring to FIG. 9, another example process 900 for reserving radio resources in accordance with various embodiments, is shown. In some embodiments, some or all of the operations of process 900 may correspond to operation 810 of process 800. In embodiments, processor circuitry of the VUE 101 (for example, baseband circuitry 204) may operate the MAC entity 502 to perform the various operations of process 900.

Process 900 may begin at operation 905 where the MAC entity 502 may select N number of radio resources for V2X communication(s). In embodiments, the N number of radio resources may be resources included in a configured resource pool. At operation 910, the MAC entity 502 may select a radio resource interval M for transmitting V2X messages/data. At operation 915, the MAC entity 502 may select an available radio resource of the N number of resources for transmission of a MAC PDU. In some embodiments, the MAC entity 502 may select resource(s) for HARQ (re)transmissions. At operation 920, the MAC entity 502 may reserve the N number of radio resources with the M interval.

At operation 925, the MAC entity 502 may determine whether the MAC PDU is available for transmission over the reserved radio resource at a corresponding time of the reserved radio resource. In embodiments, operation 925 may include determining whether any data is available at the STCH ready to be mapped to the SL-SCH. In such embodiments, the data may available for transmission when the data is placed (or stored) in a buffer associated with the STCH.

If at operation 925 the MAC entity 502 determines that there is a MAC PDU to transmit at the corresponding time, the MAC entity 502 may proceed to operation 930 to configure the PHY layer 501 to transmit the MAC PDU over the reserved resource. Operation 930 may correspond with operation 830 of process 800. Once the PHY layer 501 is configured to transmit the MAC PDU, the MAC entity 502 may proceed to operation 933 to decrement N by one.

At operation 935, the MAC entity 502 may determine whether N is equal to zero, and if not, the MAC entity 502 may loop back to operation 925 to determine whether a next MAC PDU is ready for transmission at a corresponding time for a next reserved resource. If at operation 935 the MAC entity 502 determines that N is equal to zero, the MAC entity may proceed to operation 950 to release the reserved resources and initialize (for example, reset) the N and M values to zero.

Referring back to operation 925, if the MAC entity 502 determines that there no MAC PDUs are available for transmission at the corresponding time, the MAC entity 502 does not use the reserved radio resource and may proceed to operation 940 to increment a counter. At operation 945, the MAC entity 502 may determine whether a value of the counter is greater than or equal to a configured number of resources (for example, X number of resources), and if not, the MAC entity 502 may loop back to operation 925 to determine whether a next MAC PDU is ready for transmission at a corresponding time for a next reserved resource. If at operation 945 the MAC entity 502 determines that the counter value is greater than or equal to zero, the MAC entity 502 may proceed to operation 950 to release the reserved resources and initialize (for example, reset) the N and M values to zero. After operation 950, if data arrives at the buffer after the MAC entity 502 releases the reserved radio resources, the MAC entity 502 may newly start selection of radio resource procedure again by repeating process 900 at operation 905.

FIG. 10 illustrates yet another process 1000 for reserving radio resources in accordance with various embodiments. Process 1000 may begin at operation 1005 where the MAC entity 502 may determine whether the MAC entity 502 is configured by upper layers to transmit based on sensing using a pool of resources as indicated by the PHY layer 501. If the MAC entity 501 is not configured by upper layers to transmit based on sensing, the MAC entity 501 may proceed to operation 1008 to transmit data according to an SL grant obtained over the PDCCH according to typical procedures.

If the MAC entity 501 is configured by upper layers to transmit based on sensing using a pool of resources as indicated by the PHY layer 501, the MAC entity 501 may select to create a configured SL grant corresponding to transmissions of multiple MAC PDUs at operation 1010. At operation 1013, the MAC entity 502 may determine if data is available in the STCH, and when data is available at the STCH, the MAC entity 502 may proceed to operation 1013 for each SL process configured for multiple transmissions based on sensing.

At operation 1015, the MAC entity 501 may determine whether a number of consecutive unused transmission opportunities on resources indicated in the configured SL grant is equal to a configured value (for example, sl-ReselectAfter). If sl-ReselectAfter is configured and the number of consecutive unused transmission opportunities on resources indicated in the configured SL grant is equal to sl-ReselectAfter, the MAC entity 502 may proceed to operation 1020 to clear the configured SL grant, if available; select one of the allowed values configured by upper layers (for example, in restrictResourceReservationPeriod) and set the resource reservation interval by multiplying 100 with the selected value at operation 1025; randomly select one time and frequency resource from the resources indicated by the PHY layer 501 at operation 1030; use the randomly selected resource to select a set of periodic resources spaced by the resource reservation interval for transmission opportunities of SCI and SL-SCH corresponding to the number of transmission opportunities of MAC PDUs at operation 1035; and consider the generated SL grant to be the configured SL grant at operation 1040. The random function used to select the time and frequency resource at operation 1030 may choose each allowed selection with equal probability.

At operation 1045, the MAC entity 502 may configure (or instruct) the PHY layer 501 to transmit the data using the set of periodic resources selected at operation 1035 spaced by the resource reservation interval set at operation 1025. For example, for the MAC PDU transmission opportunities that correspond to SCI transmissions, the MAC entity 502 may instruct PHY entity 501 to transmit the SCI over the PSCCH. In another example, for the MAC PDU transmission opportunities that correspond to SL-SCH transmissions (for example, application or user data), the MAC entity 502 may instruct PHY entity 501 to transmit the SL-SCH over the PSSCH. After completion of operation 1008 or 1045, process 1000 may end or repeat as necessary.

Some non-limiting examples are provided infra. The following examples pertain to further embodiments. Specifics in the examples may be used anywhere in one or more embodiments discussed previously. All optional features of devices described herein may also be implemented with respect to one or more methods or processes, and vice versa.

Example 1 may include one or more computer-readable storage media (CRSM) having instructions that, when executed by one or more processors, are to cause a Media Access Control (MAC) entity of a user equipment (UE) to: select to create a sidelink grant when a sidelink configuration indicates that the MAC entity is to transmit sidelink transmissions based on a sensing operation using indicated resources for sidelink communication; and when a number of consecutive unused transmission opportunities on resources indicated in the sidelink grant is equal to a configured value: release currently reserved radio resources of the sidelink grant, set a resource reservation interval, and select a set of resources spaced by the resource reservation interval as reserved resources for transmission of one or more sidelink transmissions. The one or more CRSM may be non-transitory CRSM.

Example 2 may include the one or more CRSM of example 1 and/or some other examples herein, wherein the instructions, when executed, are to cause the UE to operate the MAC entity to: consider the selected sidelink grant to be a configured sidelink grant.

Example 3 may include the one or more CRSM of example 1 and/or some other examples herein, wherein the sidelink grant corresponds to transmissions of multiple MAC Protocol Data Units (PDUs).

Example 4 may include the one or more CRSM of example 3 and/or some other examples herein, wherein the instructions, when executed by the one or more processors, are to cause the UE to operate the MAC entity to: select to create the sidelink grant when one or more MAC PDUs are available in a sidelink traffic channel (STCH).

Example 5 may include the one or more CRSM of example 3 and/or some other examples herein, wherein the selected set of resources are for transmission opportunities of sidelink control information (SCI) or application data that correspond to a number of transmission opportunities of the multiple MAC PDUs.

Example 6 may include the one or more CRSM of example 5 and/or some other examples herein, wherein the instructions, when executed by the one or more processors, are to cause the UE to operate the MAC entity to: instruct a Physical layer (PHY) entity to transmit the SCI over a Physical Sidelink Control Channel (PSCCH); and instruct the PHY entity to transmit the application data over a Physical Sidelink Shared Channel (PSSCH).

Example 7 may include the one or more CRSM of examples 1 to 6 and/or some other examples herein, wherein the instructions, when executed by the one or more processors, are to cause the UE to operate the MAC entity to: control performance of the sensing operation on resources of the indicated resources; and select to create the sidelink grant when the sensed resources are available for transmission of the one or more sidelink transmissions.

Example 8 may include the one or more CRSM of example 7 and/or some other examples herein, wherein the instructions, when executed by the one or more processors, are to cause the UE to: control receipt of a Radio Resource Control (RRC) message, the RRC message to indicate the sidelink configuration, the indicated resources for sidelink communication, the first configured value, and the second configured value.

Example 9 may include the one or more CRSM of example 8 and/or some other examples herein, wherein the UE is employed as a vehicle-to-everything (V2X) communication system.

Example 10 may include a system on chip (SoC) to be implemented in a user equipment (UE) of a vehicle-to-everything (V2X) communication system, the SoC comprising: baseband circuitry and memory circuitry, the memory circuitry to store instructions and the baseband circuitry is to execute the instructions to: control receipt of a Radio Resource Control (RRC) message, the RRC message including a sidelink configuration, wherein the sidelink configuration is to indicate to transmit sidelink transmissions based on a sensing operation using an individual pool of resources for sidelink communication, the individual pool of resources for sidelink communication, a number of consecutive skipped transmissions before triggering resource reselection, and one or more values that are allowed for signaling of a resource reservation period; operate a Media Access Control (MAC) entity to: select to create a sidelink grant based on a sensing operation; release currently reserved radio resources of the sidelink grant when, based on the sensing operation, a number of consecutive unused transmission opportunities on the individual pool of resources is equal to the number of consecutive skipped transmissions; set a resource reservation interval based on a value of the one or more values that are allowed for signaling of a resource reservation period; select, as reserved resources for transmission of the one or more sidelink transmissions, a set of resources spaced by the resource reservation interval; consider the selected sidelink grant to be a configured sidelink grant; and configure a physical layer (PHY) entity to transmit the one or more sidelink transmissions over the reserved resources and spaced by the resource reservation interval.

Example 11 may include the SoC of example 10 and/or some other examples herein, wherein the sidelink grant corresponds to transmissions of multiple MAC Protocol Data Units (PDUs) and wherein the baseband circuitry is to execute the instructions to operate the MAC entity to: select to create the sidelink grant when at least some of the multiple MAC PDUs are available in a sidelink traffic channel (STCH).

Example 12 may include the SoC of example 11 and/or some other examples herein, wherein the selected set of resources are for transmission opportunities of sidelink control information (SCI) or application data that correspond to a number of transmission opportunities of the multiple MAC PDUs.

Example 13 may include the SoC of example 12 and/or some other examples herein, wherein, to configure the PHY entity, the baseband circuitry is to execute the instructions to operate the MAC entity to: instruct the PHY entity to transmit the SCI over a Physical Sidelink Control Channel (PSCCH); and instruct the PHY entity to transmit the application data over a Physical Sidelink Shared Channel (PSSCH).

Example 14 may include the SoC of example 13 and/or some other examples herein, wherein the baseband circuitry is to execute the instructions to: control radio frequency (RF) circuitry of the UE to perform the sensing operation on resources of the individual pool of resources; and operate the MAC entity to select to create the sidelink grant when the sensed resources are available for transmission of the one or more sidelink transmissions.

Example 15 may include the SoC of example 10 and/or some other examples herein, wherein the sidelink configuration is a Sidelink Communication Transmission Pool Sensing Configuration (SL-CommTxPoolSensingConfig) IE, wherein the SL-CommTxPoolSensingConfig IE comprises: a Sidelink Reselection After (sl-ReselectAfter) field, and the sl-ReselectAfter is to indicate the number of consecutive skipped transmissions before triggering resource reselection for V2X sidelink communication; and a restrict Resource Reservation Period (restrictResourceReservationPeriod) field, and restrictResourceReservationPeriod field is to indicate the one or more values that are allowed for signaling of a resource reservation period.

Example 16 may include the SoC of examples 10-15 and/or some other examples herein, wherein, to set the resource reservation interval, the baseband circuitry is to execute the instructions to operate the MAC entity to: select the value of the one or more values that are allowed for signaling of a resource reservation period; and multiply the selected value by 100.

Example 17 may include an apparatus to be employed as a vehicle-to-everything (V2X) communication system, the apparatus comprising: radio frequency (RF) means for receiving a Radio Resource Control (RRC) message, the RRC message including a sidelink configuration, wherein the sidelink configuration indicates to transmit sidelink transmissions based on a sensing operation using an individual pool of resources for sidelink communication, the individual pool of resources for sidelink communication, a number of consecutive skipped transmissions before triggering resource reselection, and one or more values that are allowed for signaling of a resource reservation period; media access control (MAC) means for selecting to create a sidelink grant based on performance of a sensing operation on resources of the individual pool of resources, and when, based on the sensing operation, a number of consecutive unused transmission opportunities on the resources of the individual pool of resources is equal to the number of consecutive skipped transmissions before triggering resource reselection, the MAC means are for: releasing currently reserved radio resources, setting a resource reservation interval based on a value of the one or more values that are allowed for signaling of a resource reservation period; selecting, as reserved resources for transmission of the one or more sidelink transmissions, a set of resources spaced by the resource reservation interval; and configuring a physical layer (PHY) means to transmit the one or more sidelink transmissions using the reserved resources, wherein configuration of the PHY entity is to cause the RF circuitry to transmit the one or more sidelink transmission on the reserved resources.

Example 18 may include the apparatus of example 17 and/or some other examples herein, wherein, to set the resource reservation interval, the MAC means are for: selecting the value of the one or more values that are allowed for signaling of a resource reservation period; and multiplying the selected value by 100.

Example 19 may include the apparatus of example 17 and/or some other examples herein, wherein the MAC means are for: considering the selected sidelink grant to be a configured sidelink grant.

Example 20 may include the apparatus of example 17 and/or some other examples herein, wherein the sidelink grant corresponds to transmissions of multiple MAC Protocol Data Units (PDUs).

Example 21 may include the apparatus of example 20 and/or some other examples herein, wherein the MAC means are for: selecting to create the sidelink grant when one or more of the multiple MAC PDUs are available in a sidelink traffic channel (STCH).

Example 22 may include the apparatus of example 20 and/or some other examples herein, wherein the selected set of resources are for transmission opportunities of sidelink control information (SCI) or application data that correspond to a number of transmission opportunities of the multiple MAC PDUs.

Example 23 may include the apparatus of example 22 and/or some other examples herein, wherein, upon configuration of the PHY means, the RF means is for: transmitting the SCI over a Physical Sidelink Control Channel (PSCCH); and transmitting the application data over a Physical Sidelink Shared Channel (PSSCH).

Example 24 may include the apparatus of examples 17 to 23 and/or some other examples herein, wherein: the RF means is for performing the sensing operation on the resources of the individual pool of resources; and the MAC means are for selecting to create the sidelink grant when the sensed resources are available for the one or more sidelink transmissions.

Example 25 may include the apparatus of example 24 and/or some other examples herein, wherein the sidelink configuration is a Sidelink Communication Transmission Pool Sensing Configuration (SL-CommTxPoolSensingConfig) IE, wherein the SL-CommTxPoolSensingConfig IE comprises: a Sidelink Reselection After (sl-ReselectAfter) field, and the sl-ReselectAfter is to indicate the number of consecutive skipped transmissions before triggering resource reselection for V2X sidelink communication; and a restrict Resource Reservation Period (restrictResourceReservationPeriod) field, and restrictResourceReservationPeriod field is to indicate the one or more values that are allowed for signaling of a resource reservation period.

Example 26 may include an apparatus to be employed in a user equipment (UE) the apparatus comprising: Media Access Control (MAC) means for: selecting to create a sidelink grant when a sidelink configuration indicates that the apparatus is to transmit sidelink transmissions based on a sensing operation using indicated resources for sidelink communication; and when a number of consecutive unused transmission opportunities on resources indicated in the sidelink grant is equal to a configured value, the MAC means are for: releasing currently reserved radio resources of the sidelink grant, setting a resource reservation interval, and selecting a set of resources spaced by the resource reservation interval as reserved resources for transmission of one or more sidelink transmissions.

Example 27 may include the apparatus of example 26 and/or some other examples herein, wherein the MAC means are for: considering the selected sidelink grant to be a configured sidelink grant.

Example 28 may include the apparatus of example 26 and/or some other examples herein, wherein the sidelink grant corresponds to transmissions of multiple MAC Protocol Data Units (PDUs).

Example 29 may include the apparatus of example 28 and/or some other examples herein, wherein the MAC means are for: selecting to create the sidelink grant when one or more MAC PDUs are available in a sidelink traffic channel (STCH).

Example 30 may include the apparatus of example 28 and/or some other examples herein, wherein the selected set of resources are for transmission opportunities of sidelink control information (SCI) or application data that correspond to a number of transmission opportunities of the multiple MAC PDUs.

Example 31 may include the apparatus of example 30 and/or some other examples herein, wherein the MAC means are for: instructing a Physical layer (PHY) entity to transmit the SCI over a Physical Sidelink Control Channel (PSCCH); and instructing the PHY entity to transmit the application data over a Physical Sidelink Shared Channel (PSSCH).

Example 32 may include the apparatus of examples 26 to 31 and/or some other examples herein, further comprising: sensing means for performing the sensing operation on resources of the indicated resources; and wherein the MAC means are for selecting to create the sidelink grant when the sensed resources are available for transmission of the one or more sidelink transmissions.

Example 33 may include the apparatus of example 32 and/or some other examples herein, further comprising: reception means for receiving a Radio Resource Control (RRC) message, the RRC message is to indicate the sidelink configuration, the indicated resources for sidelink communication, the first configured value, and the second configured value.

Example 34 may include the one apparatus of example 33 and/or some other examples herein, further comprising: transmission means for transmitting SCI over a PSCCH, and transmitting data over a PSSCH.

Example 35 may include an apparatus to be implemented in a user equipment (UE) of a vehicle-to-everything (V2X) communication system, the apparatus comprising: Radio Resource Control (RRC) means for: identifying a sidelink configuration from a received RRC message, wherein the sidelink configuration is to indicate to transmit sidelink transmissions based on a sensing operation using an individual pool of resources for sidelink communication, the individual pool of resources for sidelink communication, a number of consecutive skipped transmissions before triggering resource reselection, and one or more values that are allowed for signaling of a resource reservation period; Media Access Control (MAC) means for: selecting to create a sidelink grant based on a sensing operation; releasing currently reserved radio resources of the sidelink grant when, based on the sensing operation, a number of consecutive unused transmission opportunities on the individual pool of resources is equal to the number of consecutive skipped transmissions; setting a resource reservation interval based on a value of the one or more values that are allowed for signaling of a resource reservation period;

selecting, as reserved resources for transmission of the one or more sidelink transmissions, a set of resources spaced by the resource reservation interval; considering the selected sidelink grant to be a configured sidelink grant; and configuring a physical layer (PHY) means to transmit the one or more sidelink transmissions over the reserved resources and spaced by the resource reservation interval.

Example 36 may include the apparatus of example 35 and/or some other examples herein, wherein the sidelink grant corresponds to transmissions of multiple MAC Protocol Data Units (PDUs) and wherein the MAC means are for: selecting to create the sidelink grant when at least some of the multiple MAC PDUs are available in a sidelink traffic channel (STCH).

Example 37 may include the apparatus of example 36 and/or some other examples herein, wherein the selected set of resources are for transmission opportunities of sidelink control information (SCI) or application data that correspond to a number of transmission opportunities of the multiple MAC PDUs.

Example 38 may include the apparatus of example 37 and/or some other examples herein, wherein, to configure the PHY means, the MAC means are for: instructing the PHY entity to transmit the SCI over a Physical Sidelink Control Channel (PSCCH); and instructing the PHY entity to transmit the application data over a Physical Sidelink Shared Channel (PSSCH).

Example 39 may include the apparatus of examples 35 to 38 and/or some other examples herein, further comprising: the PHY means for controlling radio frequency (RF) circuitry of the UE to perform the sensing operation on resources of the individual pool of resources, wherein the MAC means are for selecting to create the sidelink grant when the sensed resources are available for transmission of the one or more sidelink transmissions.

Example 40 may include the apparatus of examples 35 to 38 and/or some other examples herein, wherein the sidelink configuration is a Sidelink Communication Transmission Pool Sensing Configuration (SL-CommTxPoolSensingConfig) IE, wherein the SL-CommTxPoolSensingConfig IE comprises: a Sidelink Reselection After (sl-ReselectAfter) field, and the sl-ReselectAfter is to indicate the number of consecutive skipped transmissions before triggering resource reselection for V2X sidelink communication; and a restrict Resource Reservation Period (restrictResourceReservationPeriod) field, and restrictResourceReservationPeriod field is to indicate the one or more values that are allowed for signaling of a resource reservation period.

Example 41 may include the apparatus of examples 35-40 and/or some other examples herein, wherein, to set the resource reservation interval, the MAC means are for: selecting the value of the one or more values that are allowed for signaling of a resource reservation period; and multiplying the selected value by 100.

Example 42 may include an apparatus to be employed as a vehicle-to-everything (V2X) communication system, the apparatus comprising: radio frequency (RF) circuitry to receive a Radio Resource Control (RRC) message, the RRC message including a sidelink configuration, wherein the sidelink configuration indicates to transmit sidelink transmissions based on a sensing operation using an individual pool of resources for sidelink communication, the individual pool of resources for sidelink communication, a number of consecutive skipped transmissions before triggering resource reselection, and one or more values that are allowed for signaling of a resource reservation period; and a system on chip (SoC) communicatively coupled with the RF circuitry, the SoC comprising baseband circuitry with onboard memory circuitry, the memory circuitry to store instructions and the baseband circuitry is to execute the instructions to: select to create a sidelink grant based on performance of a sensing operation on resources of the individual pool of resources, and when, based on the sensing operation, a number of consecutive unused transmission opportunities on the resources of the individual pool of resources is equal to the number of consecutive skipped transmissions before triggering resource reselection: release all currently reserved radio resources, set a resource reservation interval based on a value of the one or more values that are allowed for signaling of a resource reservation period; select, as reserved resources for transmission of the one or more sidelink transmissions, a set of resources spaced by the resource reservation interval; and configure a Physical layer (PHY) entity to transmit the one or more sidelink transmissions using the reserved resources, wherein configuration of the PHY entity is to cause the RF circuitry to transmit the one or more sidelink transmission on the reserved resources.

Example 43 may include the apparatus of example 42 and/or some other examples herein, wherein, to set the resource reservation interval, the baseband circuitry is to execute the instructions to operate the MAC entity to: select the value of the one or more values that are allowed for signaling of a resource reservation period; and multiply the selected value by 100.

Example 44 may include the apparatus of example 42 and/or some other examples herein, wherein the baseband circuitry is to execute the instructions to operate the MAC entity to: consider the selected sidelink grant to be a configured sidelink grant.

Example 45 may include the apparatus of example 42 and/or some other examples herein, wherein the sidelink grant corresponds to transmissions of multiple MAC Protocol Data Units (PDUs).

Example 46 may include the apparatus of example 45 and/or some other examples herein, wherein the baseband circuitry is to execute the instructions to operate the MAC entity to: select to create the sidelink grant when one or more of the multiple MAC PDUs are available in a sidelink traffic channel (STCH).

Example 47 may include the apparatus of example 45 and/or some other examples herein, wherein the selected set of resources are for transmission opportunities of sidelink control information (SCI) or application data that correspond to a number of transmission opportunities of the multiple MAC PDUs.

Example 48 may include the apparatus of example 47 and/or some other examples herein, wherein configuration of the PHY entity is to cause the RF circuitry to: transmit the SCI over a Physical Sidelink Control Channel (PSCCH); and transmit the application data over a Physical Sidelink Shared Channel (PSSCH).

Example 49 may include the apparatus of examples 42 to 48 and/or some other examples herein, wherein: the RF circuitry is to perform the sensing operation on the resources of the individual pool of resources; and the baseband circuitry is to execute the instructions to operate the MAC entity to select to create the sidelink grant when the sensed resources are available for the one or more sidelink transmissions.

Example 50 may include the apparatus of example 49 and/or some other examples herein, wherein the sidelink configuration is a Sidelink Communication Transmission Pool Sensing Configuration (SL-CommTxPoolSensingConfig) IE, wherein the SL-CommTxPoolSensingConfig IE comprises: a Sidelink Reselection After (sl-ReselectAfter) field, and the sl-ReselectAfter is to indicate the number of consecutive skipped transmissions before triggering resource reselection for V2X sidelink communication; and a restrict Resource Reservation Period (restrictResourceReservationPeriod) field, and restrictResourceReservationPeriod field is to indicate the one or more values that are allowed for signaling of a resource reservation period.

Example 51 may include a method to be performed by a Media Access Control (MAC) entity of a user equipment (UE) the method comprising: selecting to create, by the MAC entity, a sidelink grant when a sidelink configuration indicates that the MAC entity is to transmit sidelink transmissions based on a sensing operation using indicated resources for sidelink communication; and when a number of consecutive unused transmission opportunities on resources indicated in the sidelink grant is equal to a configured value: releasing, by the MAC entity, currently reserved radio resources of the sidelink grant, setting, by the MAC entity, a resource reservation interval, and selecting, by the MAC entity, a set of resources spaced by the resource reservation interval as reserved resources for transmission of one or more sidelink transmissions.

Example 52 may include the method of example 51 and/or some other examples herein, further comprising: considering, by the MAC entity, the selected sidelink grant to be a configured sidelink grant.

Example 53 may include the method of example 51 and/or some other examples herein, wherein the sidelink grant corresponds to transmissions of multiple MAC Protocol Data Units (PDUs).

Example 54 may include the method of example 53 and/or some other examples herein, further comprising: selecting to create, by the MAC entity, the sidelink grant when one or more MAC PDUs are available in a sidelink traffic channel (STCH).

Example 55 may include the method of example 53 and/or some other examples herein, wherein the selected set of resources are for transmission opportunities of sidelink control information (SCI) or application data that correspond to a number of transmission opportunities of the multiple MAC PDUs.

Example 56 may include the method of example 55 and/or some other examples herein, further comprising: instructing, by the MAC entity, a physical layer (PHY) entity to transmit the SCI over a Physical Sidelink Control Channel (PSCCH); and instructing, by the MAC entity, the PHY entity to transmit the application data over a Physical Sidelink Shared Channel (PSSCH).

Example 57 may include the method of example 51 and/or some other examples herein, further comprising: controlling, by the MAC entity, performance of the sensing operation on resources of the indicated resources; and selecting to create, by the MAC entity, the sidelink grant when the sensed resources are available for transmission of the one or more sidelink transmissions.

Example 58 may include the method of example 57 and/or some other examples herein, further comprising: identifying, by the MAC entity, from a received a Radio Resource Control (RRC) message, the sidelink configuration, the indicated resources for sidelink communication, the first configured value, and the second configured value.

Example 59 may include the method of example 51 and/or some other examples herein, wherein setting the resource reservation interval comprises: selecting, by the MAC entity, the value of the one or more values that are allowed for signaling of a resource reservation period; and multiplying, by the MAC entity, the selected value by 100.

Example 60 may include a method to be performed by a system on chip (SoC) implemented in a user equipment (UE) of a vehicle-to-everything (V2X) communication system, the method comprising: controlling, by the SoC, receipt of a Radio Resource Control (RRC) message, the RRC message including a sidelink configuration, wherein the sidelink configuration is to indicate to transmit sidelink transmissions based on a sensing operation using an individual pool of resources for sidelink communication, the individual pool of resources for sidelink communication, a number of consecutive skipped transmissions before triggering resource reselection, and one or more values that are allowed for signaling of a resource reservation period; operating, by the SoC, a Media Access Control (MAC) entity, wherein operating the MAC entity comprises: controlling the MAC entity to select to create a sidelink grant based on a sensing operation; controlling the MAC entity to release currently reserved radio resources of the sidelink grant when, based on the sensing operation, a number of consecutive unused transmission opportunities on the individual pool of resources is equal to the number of consecutive skipped transmissions; controlling the MAC entity to set a resource reservation interval based on a value of the one or more values that are allowed for signaling of a resource reservation period; controlling the MAC entity to select, as reserved resources for transmission of the one or more sidelink transmissions, a set of resources spaced by the resource reservation interval; controlling the MAC entity to consider the selected sidelink grant to be a configured sidelink grant; and controlling the MAC entity to configure a physical layer (PHY) entity to transmit the one or more sidelink transmissions over the reserved resources and spaced by the resource reservation interval.

Example 61 may include the method of example 60 and/or some other examples herein, wherein the sidelink grant corresponds to transmissions of multiple MAC Protocol Data Units (PDUs) and wherein operating the MAC entity comprises: controlling the MAC entity to select to create the sidelink grant when at least some of the multiple MAC PDUs are available in a sidelink traffic channel (STCH).

Example 62 may include the method of example 61 and/or some other examples herein, wherein the selected set of resources are for transmission opportunities of sidelink control information (SCI) or application data that correspond to a number of transmission opportunities of the multiple MAC PDUs.

Example 63 may include the method of example 62 and/or some other examples herein, wherein configuring the PHY entity comprises: controlling the MAC entity to instruct the PHY entity to transmit the SCI over a Physical Sidelink Control Channel (PSCCH); and controlling the MAC entity to instruct the PHY entity to transmit the application data over a Physical Sidelink Shared Channel (PSSCH).

Example 64 may include the method of example 63 and/or some other examples herein, further comprising: controlling, by the SoC, radio frequency (RF) circuitry of the UE to perform the sensing operation on resources of the individual pool of resources; and operating, by the SoC, the MAC entity to select to create the sidelink grant when the sensed resources are available for transmission of the one or more sidelink transmissions.

Example 65 may include the method of example 60 and/or some other examples herein, wherein the sidelink configuration is a Sidelink Communication Transmission Pool Sensing Configuration (SL-CommTxPoolSensingConfig) IE, wherein the SL-CommTxPoolSensingConfig IE comprises: a Sidelink Reselection After (sl-ReselectAfter) field, and the sl-ReselectAfter is to indicate the number of consecutive skipped transmissions before triggering resource reselection for V2X sidelink communication; and a restrict Resource Reservation Period (restrictResourceReservationPeriod) field, and restrictResourceReservationPeriod field is to indicate the one or more values that are allowed for signaling of a resource reservation period.

Example 66 may include the method of example 60 and/or some other examples herein, wherein, to set the resource reservation interval, the baseband circuitry is to execute the instructions to operate the MAC entity to: select the value of the one or more values that are allowed for signaling of a resource reservation period; and multiply the selected value by 100.

Example 67 may include a method to be performed by a vehicle-to-everything (V2X) communication system, the method comprising: receiving, by the V2X communication system, a Radio Resource Control (RRC) message, the RRC message including a sidelink configuration, wherein the sidelink configuration indicates to transmit sidelink transmissions based on a sensing operation using an individual pool of resources for sidelink communication, the individual pool of resources for sidelink communication, a number of consecutive skipped transmissions before triggering resource reselection, and one or more values that are allowed for signaling of a resource reservation period; operating, by the V2X communication system, media access control (MAC) entity, including: operating the MAC entity to select to create a sidelink grant based on performance of a sensing operation on resources of the individual pool of resources, and when, based on the sensing operation, a number of consecutive unused transmission opportunities on the resources of the individual pool of resources is equal to the number of consecutive skipped transmissions before triggering resource reselection, operating the MAC entity to: release currently reserved radio resources, set a resource reservation interval based on a value of the one or more values that are allowed for signaling of a resource reservation period; select, as reserved resources for transmission of the one or more sidelink transmissions, a set of resources spaced by the resource reservation interval; and configure a physical layer (PHY) entity to transmit the one or more sidelink transmissions using the reserved resources, wherein configuration of the PHY entity is to cause the RF circuitry to transmit the one or more sidelink transmission on the reserved resources.

Example 68 may include the method of example 67 and/or some other examples herein, wherein setting the resource reservation interval comprises: operating the MAC entity to select the value of the one or more values that are allowed for signaling of a resource reservation period; and operating the MAC entity to multiply the selected value by 100.

Example 69 may include the method of example 67 and/or some other examples herein, further comprising: operating the MAC entity to considering the selected sidelink grant to be a configured sidelink grant.

Example 70 may include the method of example 67 and/or some other examples herein, wherein the sidelink grant corresponds to transmissions of multiple MAC Protocol Data Units (PDUs).

Example 71 may include the method of example 70 and/or some other examples herein, further comprising: operating the MAC entity to select to create the sidelink grant when one or more of the multiple MAC PDUs are available in a sidelink traffic channel (STCH).

Example 72 may include the method of example 70 and/or some other examples herein, wherein the selected set of resources are for transmission opportunities of sidelink control information (SCI) or application data that correspond to a number of transmission opportunities of the multiple MAC PDUs.

Example 73 may include the method of example 72 and/or some other examples herein, wherein, upon configuration of the PHY layer, the method comprises: transmitting, by the V2X communication system, the SCI over a Physical Sidelink Control Channel (PSCCH); and transmitting, by the V2X communication system, the application data over a Physical Sidelink Shared Channel (PSSCH).

Example 74 may include the method of example 67 and/or some other examples herein, further comprising: performing, by the V2X communication system, the sensing operation on the resources of the individual pool of resources; and operating, by the V2X communication system, the MAC entity to select to create the sidelink grant when the sensed resources are available for the one or more sidelink transmissions.

Example 75 may include the method of example 74 and/or some other examples herein, wherein the sidelink configuration is a Sidelink Communication Transmission Pool Sensing Configuration (SL-CommTxPoolSensingConfig) IE, wherein the SL-CommTxPoolSensingConfig IE comprises: a Sidelink Reselection After (sl-ReselectAfter) field, and the sl-ReselectAfter is to indicate the number of consecutive skipped transmissions before triggering resource reselection for V2X sidelink communication; and a restrict Resource Reservation Period (restrictResourceReservationPeriod) field, and restrictResourceReservationPeriod field is to indicate the one or more values that are allowed for signaling of a resource reservation period.

Example 76 may include one or more computer-readable storage media to store instructions, which when executed by one or more processors of a user equipment, cause the user equipment to perform the method of examples 51-75. The one or more computer-readable storage media may be non-transitory computer-readable storage media.

Example 77 may include an apparatus comprising means to perform one or more elements of a method described in or related to any of examples 1-76, or any other method or process described herein.

Example 78 may include one or more non-transitory computer-readable media comprising instructions to cause an electronic device, upon execution of the instructions by one or more processors of the electronic device, to perform one or more elements of a method described in or related to any of examples 1-76, or any other method or process described herein.

Example 79 may include an apparatus comprising logic, modules, or circuitry to perform one or more elements of a method described in or related to any of examples 1-76, or any other method or process described herein.

Example 80 may include a method, technique, or process as described in or related to any of examples 1-76, or portions or parts thereof.

Example 81 may include an apparatus comprising: one or more processors and one or more computer readable media comprising instructions that, when executed by the one or more processors, cause the one or more processors to perform the method, techniques, or process as described in or related to any of examples 1-76, or portions thereof.

Example 82 may include a signal as described in or related to any of examples 1-76, or portions or parts thereof.

Example 83 may include a signal in a wireless network as shown and described herein.

Example 84 may include a method of communicating in a wireless network as shown and described herein.

Example 85 may include a system for providing wireless communication as shown and described herein.

Example 86 may include a device for providing wireless communication as shown and described herein.

The foregoing description of the above examples provides illustration and description for the example embodiments disclosed herein, but the above Examples are not intended to be exhaustive or to limit the scope of the invention to the precise form disclosed. Modifications and variations are possible in light of the above teachings and/or may be acquired from practice of various implementations of the embodiments discussed herein. The foregoing description of one or more implementations provides illustration and description, but is not intended to be exhaustive or to limit the scope of embodiments to the precise form disclosed. Modifications and variations are possible in light of the above teachings or may be acquired from practice of various embodiments

The invention claimed is:

1. One or more non-transitory computer-readable storage media having instructions that, when executed by one or more processors, cause a Media Access Control (MAC) entity of a user equipment (UE) to:
    create a sidelink grant when a Sidelink Communication Transmission Pool Sensing Configuration (SL-CommTxPoolSensingConfig) information element (IE) indicates that the MAC entity is to transmit sidelink transmissions based at least in part on a sensing operation using indicated resources for sidelink communication;
    determine, based at least in part on a Sidelink Reselection After (sl-ReselectAfter) field of the SL-CommTxPoolSensingConfig IE, that a number of consecutive unused transmission opportunities on resources indicated in the sidelink grant satisfies a configured value;
    release, based at least in part on the determination that the number of consecutive unused transmission opportunities satisfies the configured value, currently reserved radio resources of the sidelink grant;
    set, based at least in part on the determination that the number of consecutive unused transmission opportunities satisfies the configured value, a resource reservation interval based at least in part on a restrict Resource Reservation Period (restrict ResourceReservationPeriod) field of the SL-CommTxPoolSensingConfig IE; and
    select, based at least in part on the determination that the number of consecutive unused transmission opportunities satisfies the configured value, a set of resources spaced by the resource reservation interval as reserved resources for transmission of one or more sidelink transmissions.

2. The one or more non-transitory computer-readable storage media of claim 1, wherein the instructions, when executed, cause the UE to operate the MAC entity to:
    consider the selected sidelink grant to be a configured sidelink grant.

3. The one or more non-transitory computer-readable storage media of claim 1, wherein the sidelink grant corresponds to transmissions of multiple MAC Protocol Data Units (PDUs).

4. The one or more non-transitory computer-readable storage media of claim 3, wherein the instructions, when executed by the one or more processors, cause the UE to operate the MAC entity to:
    select to create the sidelink grant when one or more MAC PDUs are available in a sidelink traffic channel (STCH).

5. The one or more non-transitory computer-readable storage media of claim 3, wherein the selected set of resources are for transmission opportunities of sidelink control information (SCI) or application data that correspond to a number of transmission opportunities of the multiple MAC PDUs.

6. The one or more non-transitory computer-readable storage media of claim 5, wherein the instructions, when executed by the one or more processors, cause the UE to operate the MAC entity to:
    instruct a Physical layer (PHY) entity to transmit the SCI over a Physical Sidelink Control Channel (PSCCH); and
    instruct the PHY entity to transmit the application data over a Physical Sidelink Shared Channel (PSSCH).

7. The one or more non-transitory computer-readable storage media of claim 1, wherein the instructions, when executed by the one or more processors, cause the UE to operate the MAC entity to:
    control performance of the sensing operation on resources of the indicated resources; and select to create the sidelink grant when the sensed resources are available for transmission of the one or more sidelink transmissions.

8. The one or more non-transitory computer-readable storage media of claim 7, wherein the instructions, when executed by the one or more processors, cause the UE to:
    control receipt of a Radio Resource Control (RRC) message, the RRC message to indicate the sidelink configuration, the indicated resources for sidelink communication, an indication of the configured value, and an indication of the resource reservation interval.

9. A method comprising:
    creating, by a media access control (MAC) entity of a user equipment (UE), a sidelink grant when a Sidelink Communication Transmission Pool Sensing Configuration (SL-CommTxPoolSensingConfig) information element (IE) indicates that the MAC entity is to transmit sidelink transmissions based at least in part on a sensing operation using indicated resources for sidelink communication;
    determining, by the MAC entity based at least in part on a Sidelink Reselection After (sl-ReselectAfter) field of the SL-CommTxPoolSensingConfig IE, a number of consecutive skipped transmission opportunities; and
    when the number of consecutive skipped transmission opportunities satisfies a configured value:
        releasing, by the MAC entity, currently reserved radio resources of the sidelink grant,
        determining, by the MAC entity, a resource reservation interval based at least in part on a restrict Resource Reservation Period (restrictResourceReservationPeriod) field of the SL-CommTxPoolSensingConfig IE, and
        selecting, by the MAC entity, a set of resources spaced by the resource reservation interval as reserved resources for transmission of one or more sidelink transmissions.

10. The method of claim 9, wherein the sl-ReselectAfter field is to indicate a number of consecutive transmissions before triggering resource reselection for vehicle-to-everything (V2X) sidelink communication.

11. The method of claim 9, wherein the restrictResourceReservationPeriod field is to indicate the one or more values that are allowed for signaling of a resource reservation period.

12. The method of claim 9, further comprising considering, by the MAC entity, the selected sidelink grant to be a configured sidelink grant.

13. The method of claim 9, wherein the sidelink grant corresponds to transmissions of multiple MAC Protocol Data Units (PDUs).

14. The method of claim 13, further comprising selecting, by the MAC entity, to create the sidelink grant when one or more MAC PDUs are available in a sidelink traffic channel (STCH).

15. The method of claim 13, wherein the selected set of resources are for transmission opportunities of sidelink control information (SCI) or application data that correspond to a number of transmission opportunities of the multiple MAC PDUs.

16. The method of claim 15, further comprising:
 instructing, by the MAC entity, a Physical layer (PHY) entity to transmit the SCI over a Physical Sidelink Control Channel (PSCCH); and
 instructing, by the MAC entity, the PHY entity to transmit the application data over a Physical Sidelink Shared Channel (PSSCH).

17. The method of claim 9, wherein the instructions, further comprising:
 controlling, by the MAC entity, performance of the sensing operation on resources of the indicated resources; and
 selecting, by the MAC entity, to create the sidelink grant when the sensed resources are available for transmission of the one or more sidelink transmissions.

18. The method of claim 17, further comprising controlling, by the MAC entity, receipt of a Radio Resource Control (RRC) message, the RRC message to indicate the SL-CommTxPoolSensingConfig IE.

19. A system on chip (SoC) to be implemented in a user equipment (UE) of a vehicle-to-everything (V2X) communication system, wherein the SoC comprises:
 memory circuitry to store instructions; and
 baseband circuitry communicatively coupled with the memory circuitry, the baseband circuitry to:
  generate a sidelink grant when a Sidelink Communication Transmission Pool Sensing Configuration (SL-CommTxPoolSensingConfig) information element (IE) indicates that the MAC entity is to transmit sidelink transmissions based at least in part on a sensing operation using indicated resources for sidelink communication;
  determine, based at least part on a Sidelink Reselection After (sl-ReselectAfter) field of the SL-CommTxPoolSensingConfig IE, a number of consecutive skipped transmission opportunities;
  determine that a number of consecutive skipped transmission opportunities satisfies a configured value, and when the number of consecutive skipped transmission opportunities satisfies the configured value:
   release currently reserved radio resources of the sidelink grant;
   determine a resource reservation interval based at least in part on a restrict Resource Reservation Period (restrictResourceReservationPeriod) field of the SL-CommTxPoolSensingConfig IE; and
   select a set of resources spaced by the resource reservation interval as reserved resources for transmission of one or more sidelink transmissions.

20. The SoC of claim 19, wherein the sl-ReselectAfter field is to indicate a number of consecutive skipped transmissions before triggering resource reselection for vehicle-to-everything (V2X) sidelink communication.

21. The SoC of claim 19, wherein the restrictResourceReservationPeriod field is to indicate the one or more values that are allowed for signaling of a resource reservation period.

22. The SoC of claim 19, wherein the baseband circuitry is further to consider the selected sidelink grant to be a configured sidelink grant.

23. The SoC of claim 19, wherein the sidelink grant corresponds to transmissions of multiple MAC Protocol Data Units (PDUs).

24. The SoC of claim 19, wherein the baseband circuitry is further to:
 control performance of the sensing operation on resources of the indicated resources; and
 select to create the sidelink grant when the sensed resources are available for transmission of the one or more sidelink transmissions.

25. The SoC of claim 24, wherein the baseband circuitry is further to control receipt of a Radio Resource Control (RRC) message, the RRC message to indicate the SL-CommTxPoolSensingConfig IE.

* * * * *